Sept. 21, 1926.

E. A. SPERRY

ACCELERATING MEANS FOR AUTOMOTIVE VEHICLES

Filed June 14, 1920 10 Sheets-Sheet 1

1,600,651

INVENTOR
ELMER A. SPERRY.
BY
Herbert H. Thompson
his ATTORNEY.

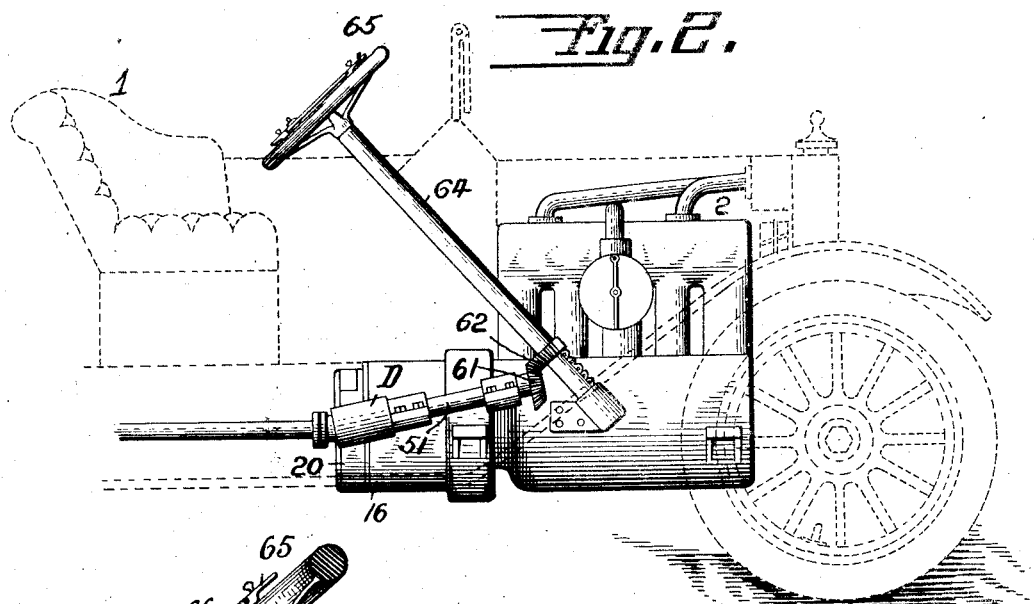
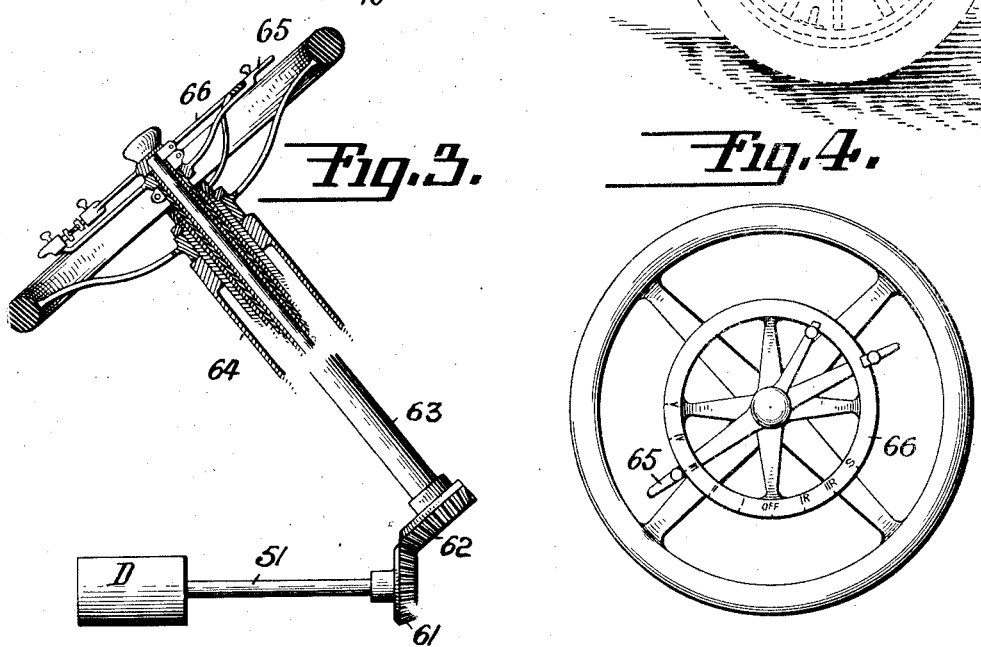
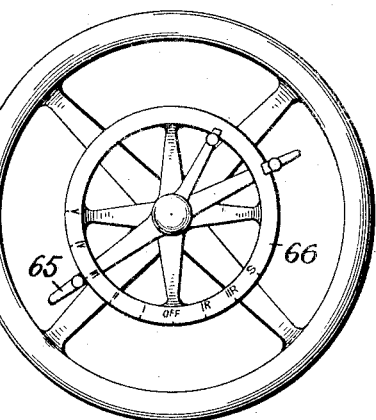
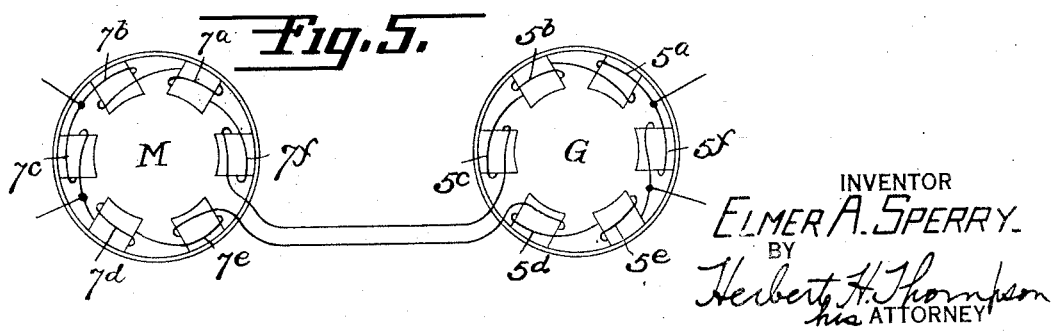

Sept. 21, 1926.  
E. A. SPERRY  
1,600,651  
ACCELERATING MEANS FOR AUTOMOTIVE VEHICLES  
Filed June 14, 1920 10 Sheets-Sheet 3
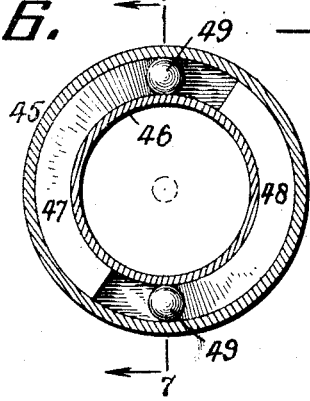
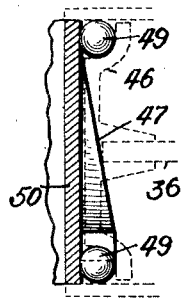
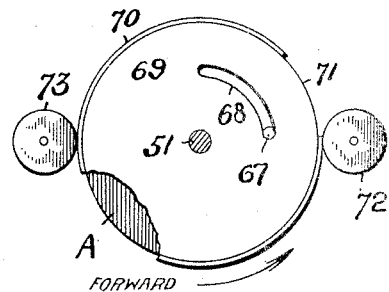
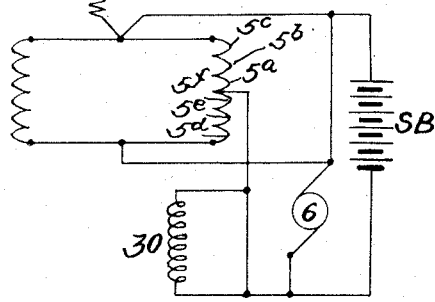
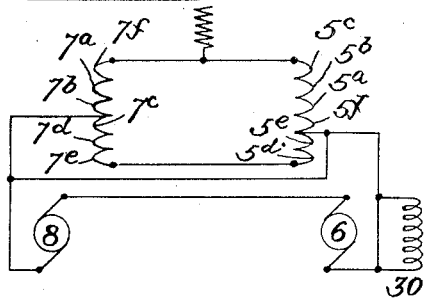
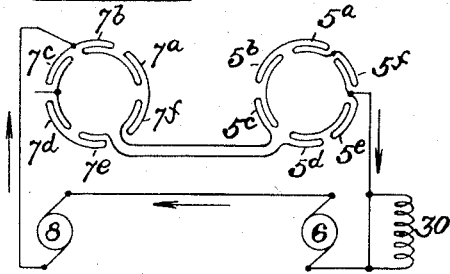
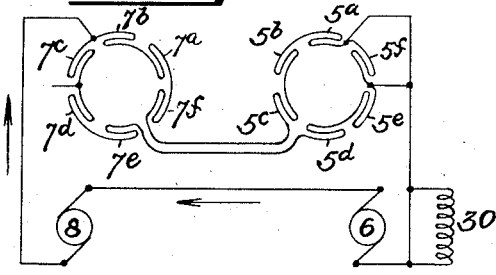
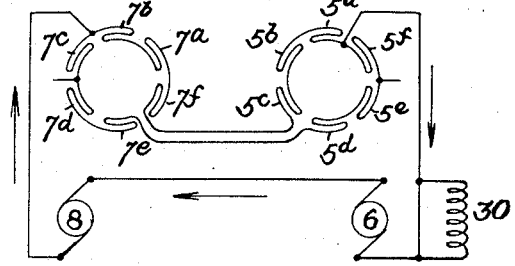
INVENTOR  
ELMER A. SPERRY  
BY  
Herbert H. Thompson  
his ATTORNEY

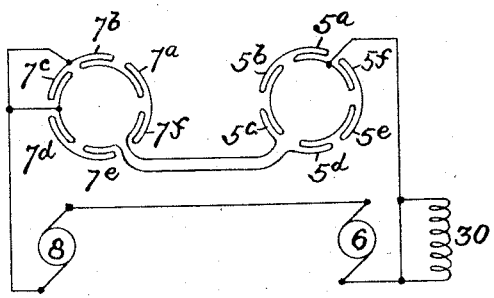
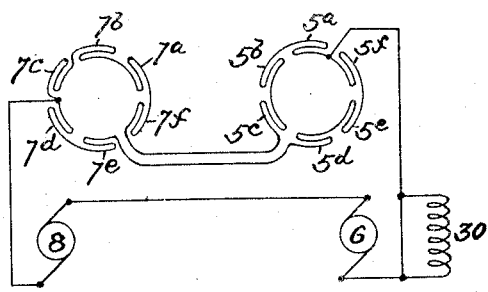
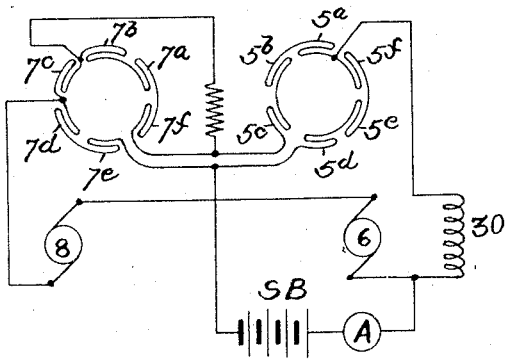
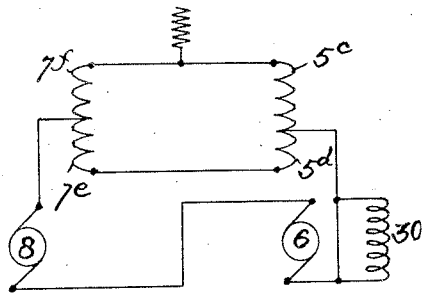
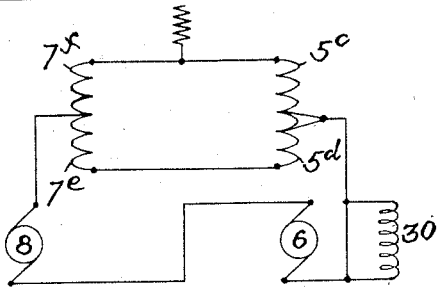
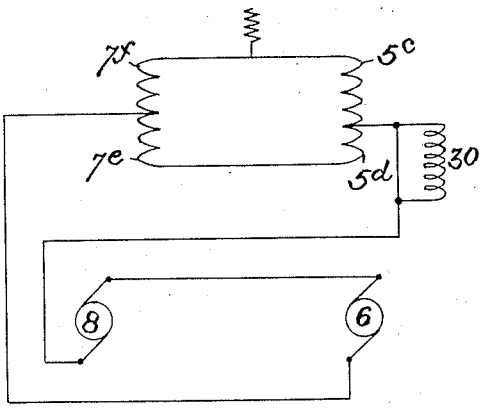
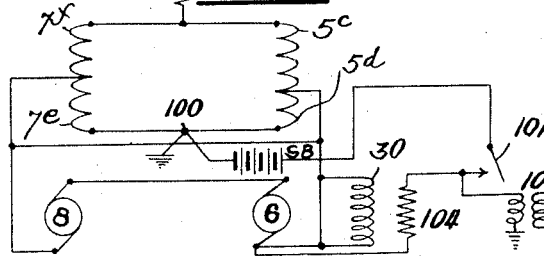

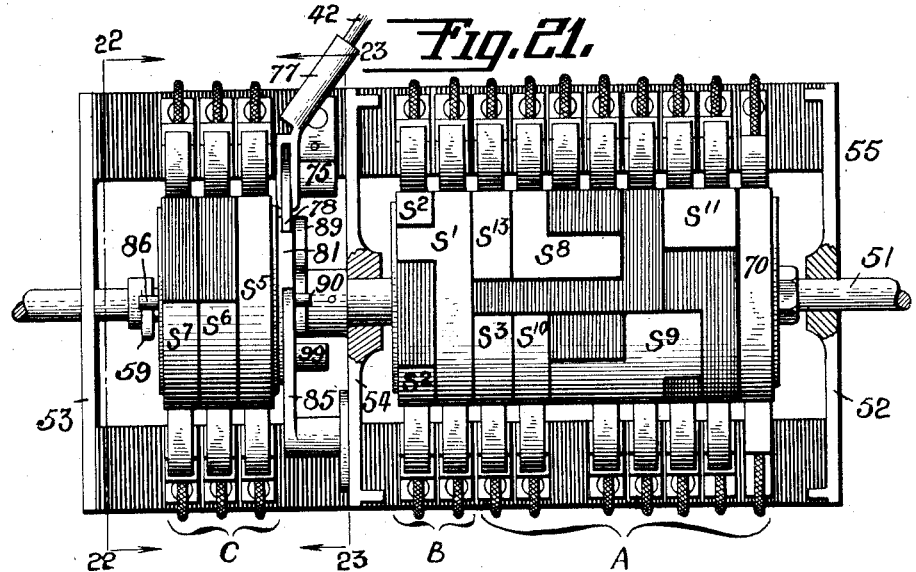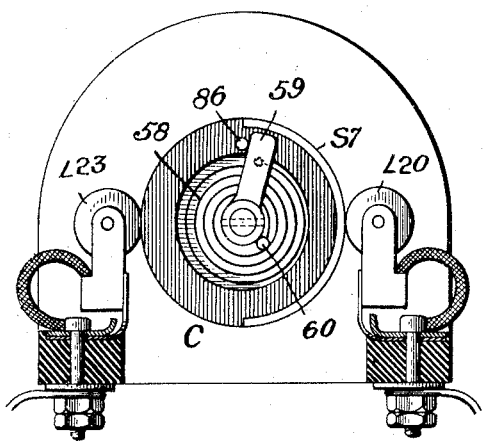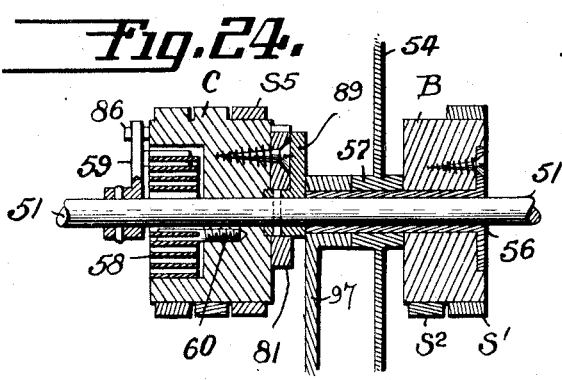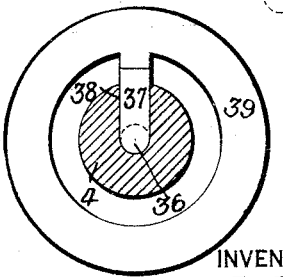

INVENTOR
ELMER A. SPERRY.
BY
Herbert H. Thompson
his ATTORNEY

Sept. 21, 1926.

E. A. SPERRY 1,600,651

ACCELERATING MEANS FOR AUTOMOTIVE VEHICLES

Filed June 14, 1920     10 Sheets-Sheet 7

INVENTOR
ELMER A. SPERRY
BY
Herbert H. Thompson
his ATTORNEY

Sept. 21, 1926.

E. A. SPERRY 1,600,651

ACCELERATING MEANS FOR AUTOMOTIVE VEHICLES

Filed June 14, 1920   10 Sheets-Sheet 8

INVENTOR
ELMER A. SPERRY
BY
Herbert H. Thompson
his ATTORNEY

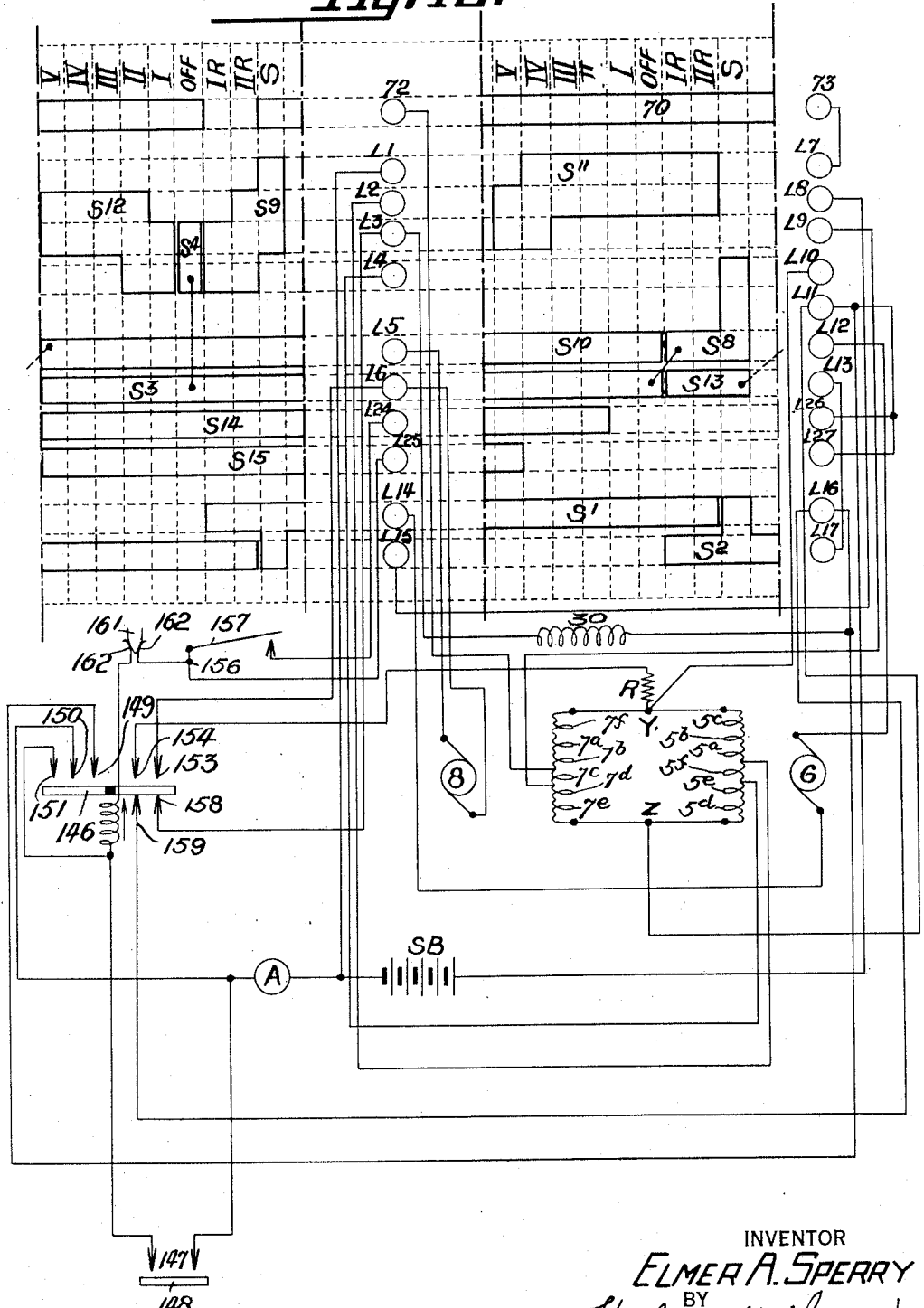

Sept. 21, 1926.
E. A. SPERRY
1,600,651
ACCELERATING MEANS FOR AUTOMOTIVE VEHICLES
Filed June 14, 1920  10 Sheets-Sheet 10
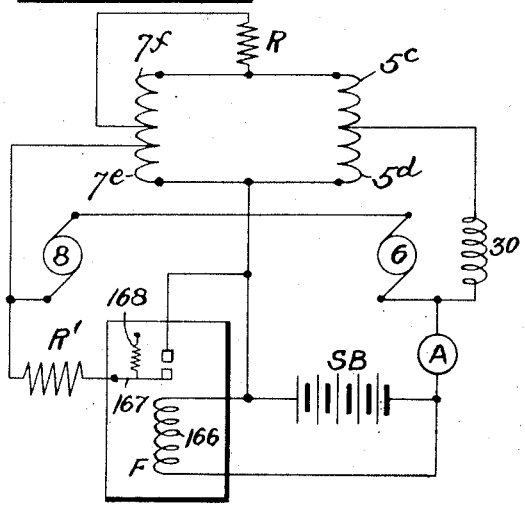
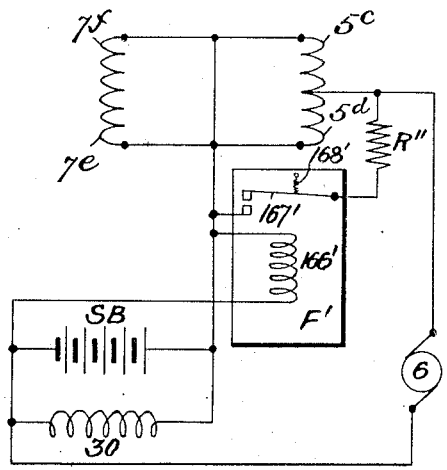
INVENTOR
ELMER A. SPERRY
BY
Herbert H. Thompson
his ATTORNEY Patented Sept. 21, 1926.

1,600,651

UNITED STATES PATENT OFFICE.

ELMER A. SPERRY, OF BROOKLYN, NEW YORK, ASSIGNOR TO SPERRY DEVELOPMENT COMPANY, OF DOVER GREEN, DELAWARE, A CORPORATION OF DELAWARE.

ACCELERATING MEANS FOR AUTOMOTIVE VEHICLES.

Application filed June 14, 1920. Serial No. 388,729.

This invention relates to power transmission mechanism especially adapted for vehicles. It consists in substituting a coupling between the prime mover and the running gear of the vehicle which has the following peculiarities:

It has long been known that the smoothest possible acceleration of a vehicle is secured by using electro-dynamic means. This has been abundantly established by the application of the Entz system. This, however, has been found to have very serious drawbacks, such as, running in one direction only, and especially in continuous running of the car there are large losses due to both the generator and the motor which are inherent in electrical equipment, increasing the expense of operation.

It is the object of the present invention to utilize all of the good features of the electro-dynamic system and to eliminate the bad features. This is accomplished by dividing the transmission into two parts, consisting of the electro-dynamic connection and a straight-through mechanical connection, confining the former to its sphere of greatest contribution, namely, the smooth and powerful acceleration of the car, and when this has been accomplished doing away with it entirely and substituting therefor the straight-through connection which is purely mechanical and has ideal efficiency.

In all the present day motor vehicles the flexibility of the engine is depended upon for speed control of the vehicle when the straight-through connection is in operation, but in this case the same flexibility of the engine speed control may be utilized in the electro-dynamic mechanism during the acceleration period as hereinafter described.

The characteristics of the electro-dynamic accelerator portion of our drive are that it not only accelerates but develops torque in response to the speed of the prime mover, while the torque delivered is proportionate to the differential speeds of the driver and driven element, said torque being greatest when this factor is the highest, namely, when the driven element is at rest and the driver is operating at considerable speed. Another valuable factor is the controller action in varying the coupling between the generator and motor whereby another variation of the torque range or gradient is secured.

Transmission systems have been proposed which consist of a generator coupled to a prime mover and electrically connected with a motor mechanically coupled to the load, in combination with a clutch for mechanically coupling the driving and driven elements for long runs so that unnecessary waste of electrical energy may be avoided. It has been proposed in connection with the systems above outlined to provide a controller for establishing electrical connections to vary the torque and speed of the driven element and to operate the clutch when the controller is moved to a given position. In the system which I have provided, however, the clutch is controlled directly by the relative speed of the driving and driven members and is not dependent for its operation upon any particular position of the controller which varies the speed of the driven member. While the said controller may aid in bringing the speed of the driven member up to the proper relation to the speed of the driving member so that the clutch may operate, the operation of the clutch can also take place when for any reason the speed of said driven member arrives at the said relationship independently of the controller, as when the vehicle is traveling down hill. In other words, the operation of the clutch is dependent directly upon the relative speed of the driving and driven members, but it may also be dependent in a subsidiary capacity upon the arrival of the motor controller at a particular point.

Another object of my invention is the provision of clutch operating means independent of variations in the voltage or current in the generator or motor and governed directly by the speed relationship between the driving and driven members.

Another object is the provision of means for operating a jaw or other non-slip clutch automatically to couple the driving and driven elements together when the speeds of said elements become substantially equal. It has previously been proposed to operate a friction clutch automatically in the combination above mentioned by means of a motor controller which is moved to a given point, and it has also been proposed to operate a jaw clutch manually. By the means which I have provided, however, the advantage of the considerably smaller size of the positive clutch is retained and at the same time the feature of automatic, as distinguished from manual, clutch operation is provided.

Thus we see that there is provided means for bringing the driven element or running gear of the vehicle up to any desired speed by gradual acceleration contributed by the electrical equipment, whereupon as by dropping down the engine speed, such relationship of speeds as has been predetermined is established. The clutch serves to automatically and mechanically couple the driving and driven elements independently of the electrical equipment with its lower efficiencies which now ceases to function and is done away with completely as far as any contribution it makes to the driving of the vehicle is concerned.

Another object of the invention is to divide up the transmission into two parts, one performing the functions of accelerating the load, while the other performs the straight-through coupling, this combination having the advantage of performing the continuous driving of the vehicle through a substituted connection having high and practically perfect efficiency and thereby cutting out the losses that are inevitably associated with the accelerating portion of the transmission as a whole. Although the accelerator or electro-dynamic portion of the transmission may have high efficiency yet its losses are continuous when it is used as a continuous drive of the vehicle. The difficulty is overcome by substituting for it the straight-through mechanical connection substantially doing away with any further functioning or operation of the accelerating factor.

An important factor of the transmission which will be appreciated constitutes an added point in the preferred form of this invention. After the acceleration has reached any desired point the straight-through connection is effected automatically by simply establishing any predetermined approach to equality of speeds between the driving and the driven elements, the operation of this coupling being fully described herein.

A further object is to provide simple and efficient means involving a minimum number of part for ventilating and cooling the transmission apparatus.

Still another object is the provision of certain novel features of control for transmission systems of the type above outlined. Other objects and advantages will appear as the invention is hereinafter developed.

Referring to the drawings wherein I have shown what I now consider to be the preferred forms of my invention:

Fig. 2 is a fragmentary elevation illustrating diagrammatically my invention as applied to an automobile, the latter being shown in dotted lines.

Fig. 3 is a fragmentary detail view, partly in section, showing one form of controller operating means.

Fig. 4 is a plan view of the controller operating means of Fig. 3.

Fig. 5 is a diagrammatic view of the field windings of the generator and motor of Fig. 1.

Fig. 6 is an elevation of a detail.

Fig. 7 is a sectional view taken on line 7—7 of Fig. 6, certain parts being removed and shown in dotted lines.

Fig. 8 is a view of a detail.

Figs. 9–19, inclusive, are diagrammatic views showing electrical connections corresponding to different positions of the controllers.

Fig. 20 is a wiring diagram illustrating another feature of my invention.

Fig. 21 is a plan view of an arrangement of controllers for establishing the electrical connections above referred to.

Fig. 22 is a sectional view taken on line 22—22 of Fig. 21.

Fig. 23 is a sectional view taken on line 23—23 of Fig. 21.

Fig. 24 is a longitudinal section of parts shown in Fig. 21.

Figure 1:
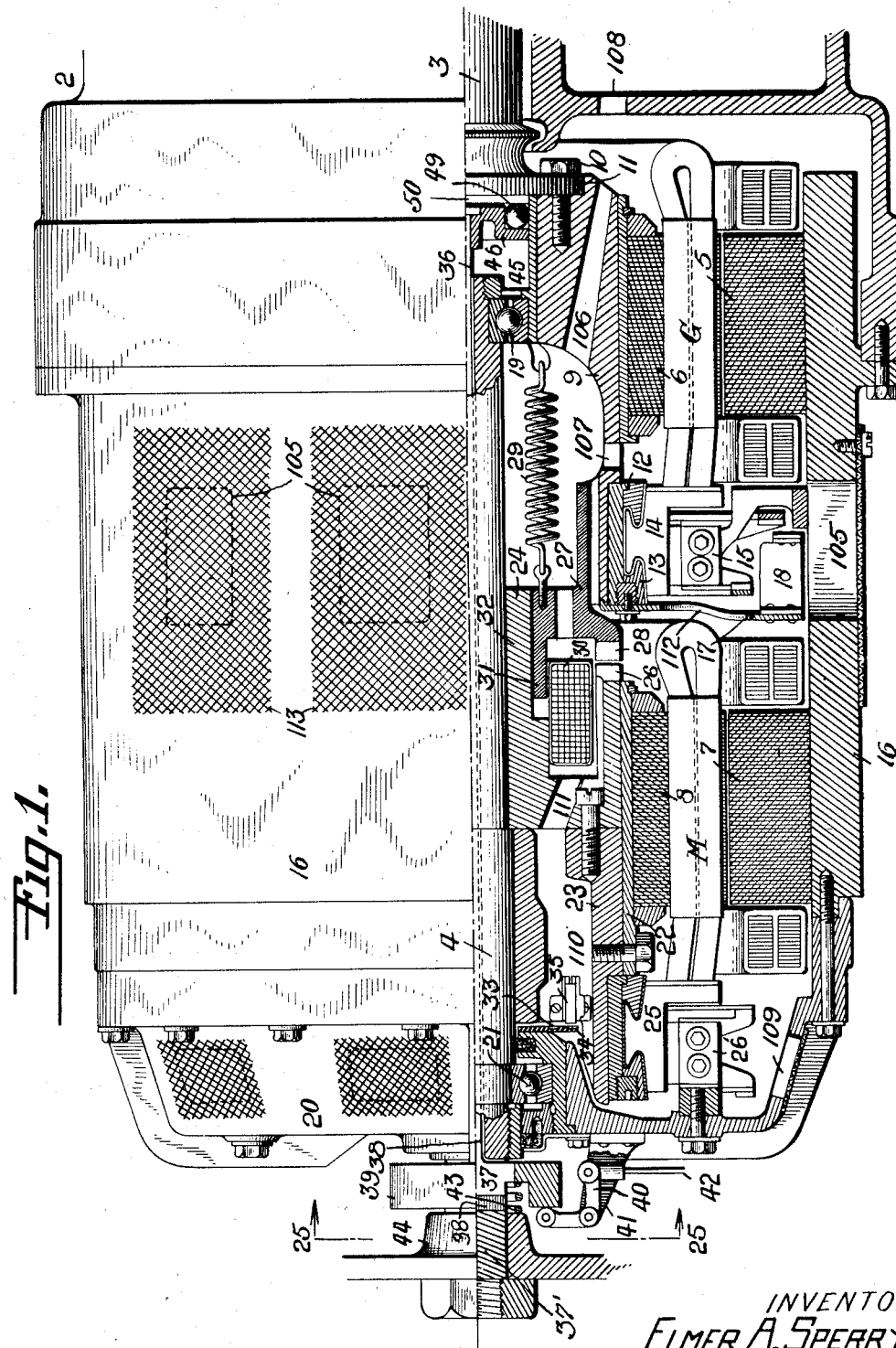
Fig. 1 is a view partly in section of a preferred form of electro-dynamic transmission system.

Fig. 25 is a sectional view taken on line 25—25 of Fig. 1.

Figure 26:
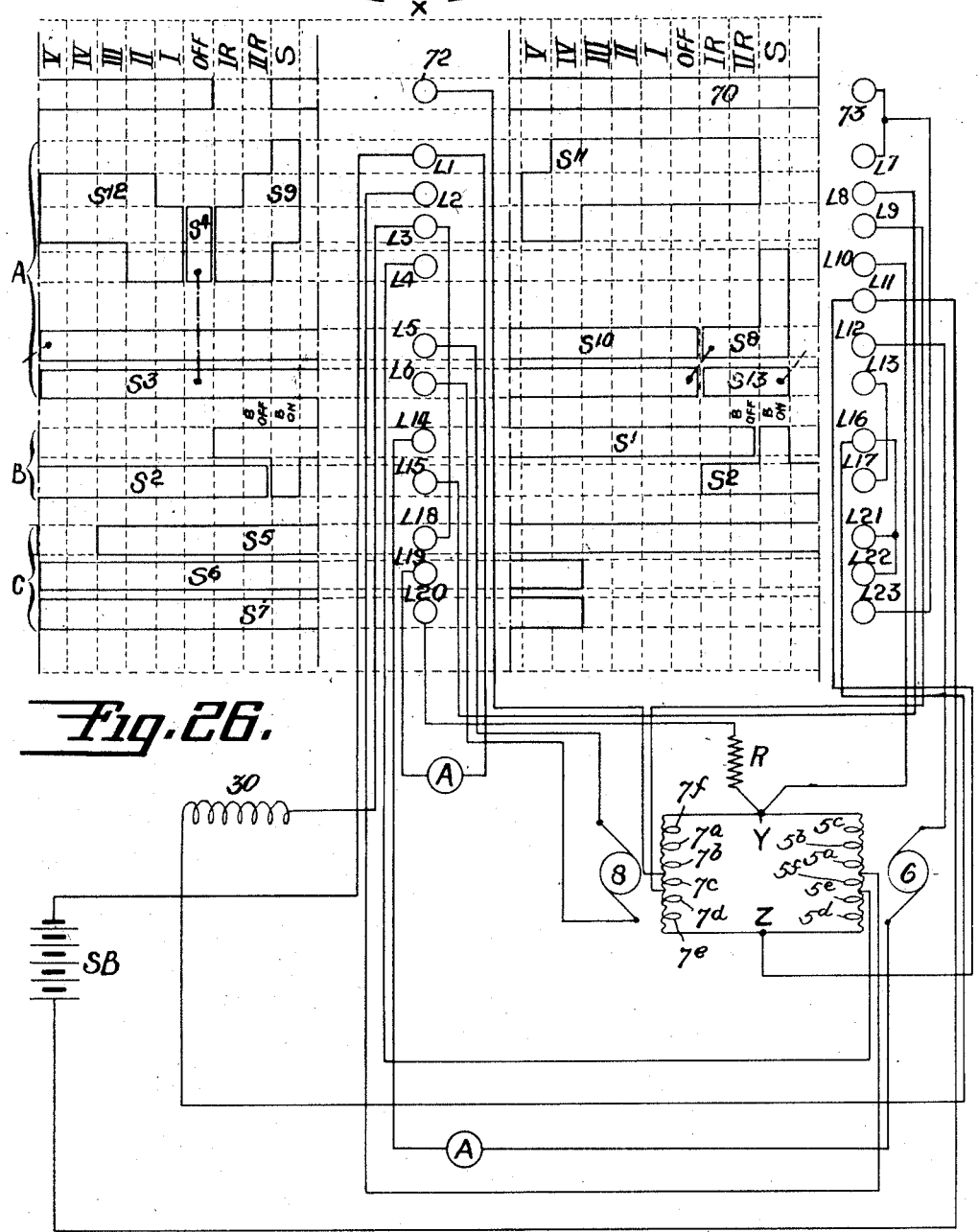

Fig. 26 is a wiring diagram of the controller connections.

Figs. 27–32, inclusive, are diagrammatic views showing different positions of parts associated with the clutch controller.

Figure 33:
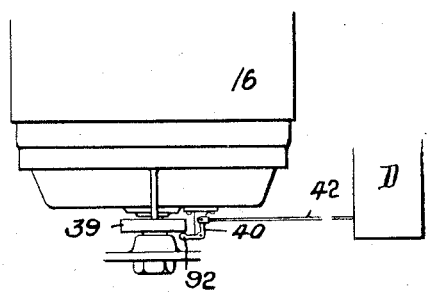
Figure 32:
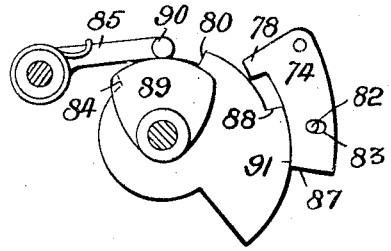

Fig. 33 is a diagrammatic plan view showing an arrangement of certain parts for operating the clutch controller.

Figure 34:
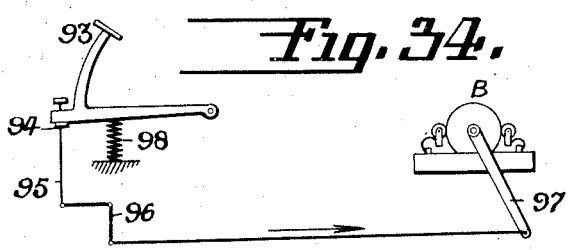

Fig. 34 is a diagrammatic view of one form of means for operating the brake controller.

Figure 35:
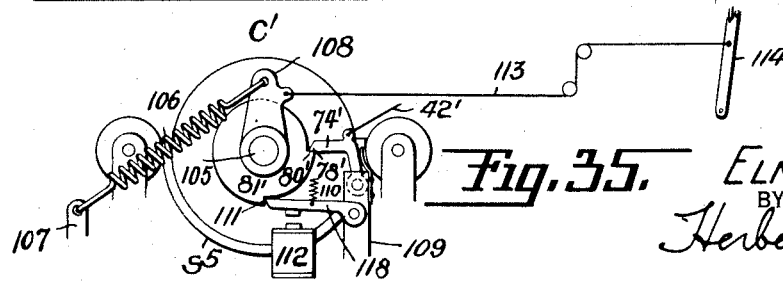

Fig. 35 is a view of a modified form of means for operating the clutch controller.

Figures 36, 37:
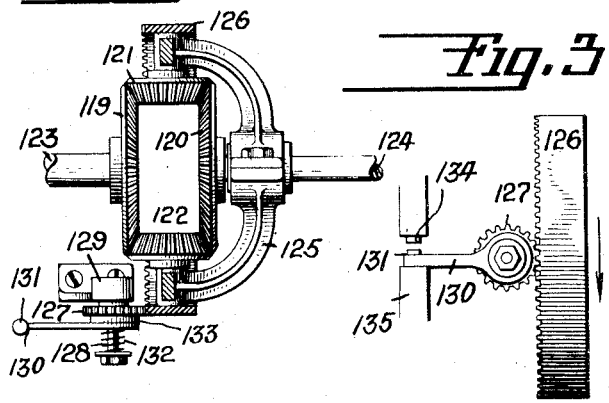

Fig. 36 is a view of a modified form of means for controlling the operation of the clutch.

Fig. 37 is a detail view of parts shown in Fig. 36.

Figure 38:
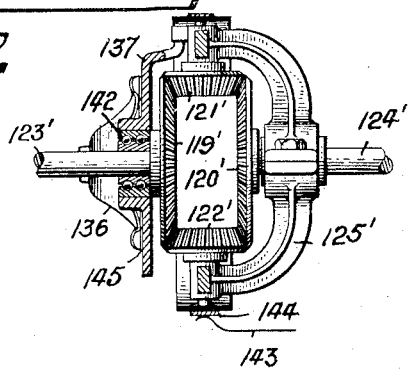

Fig. 38 is a view of another modified form of clutch controlling means.

Figure 39:
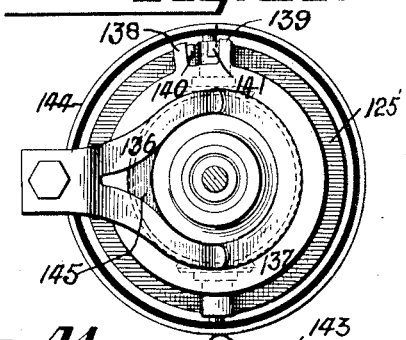

Fig. 39 is an end view of parts shown in Fig. 38.

Figure 40:
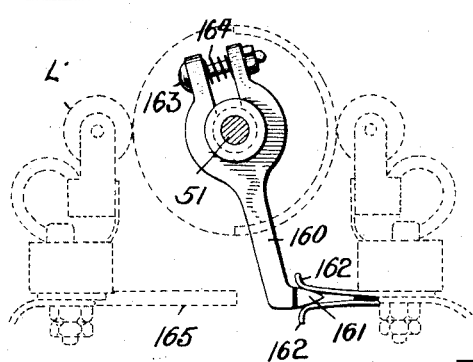

Fig. 40 is a detail view of certain circuit breaking means operable from the main controller.

Figure 41:
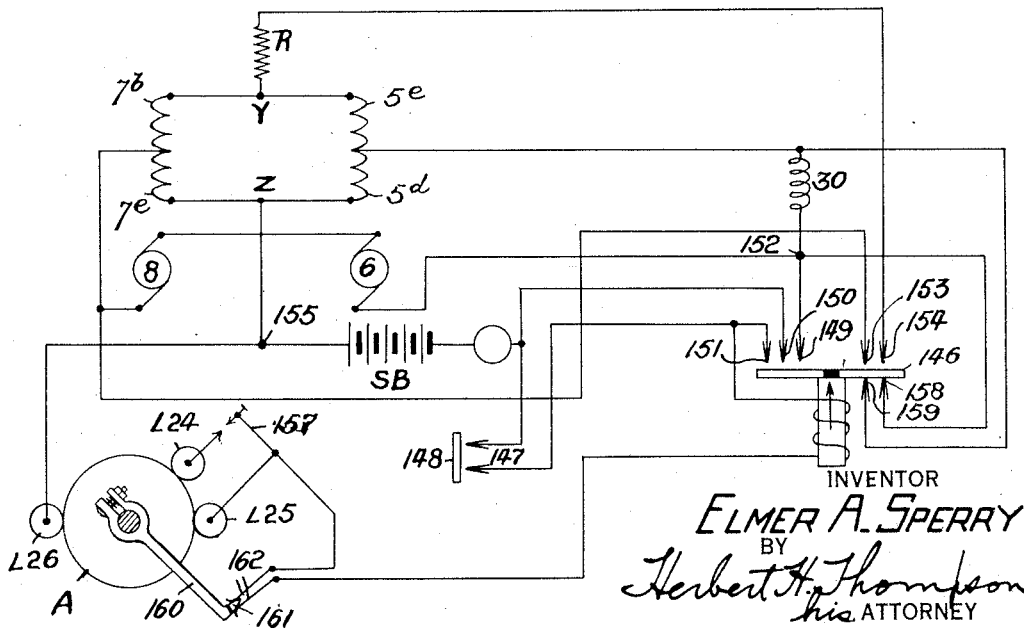

Fig. 41 is a modified wiring diagram.

Fig. 42 is a diagram showing how the connections shown in Fig. 41 can be made from the main controller and the brake controller.

Fig. 43 is a wiring diagram showing an alternative form of means for regulating the charging of the storage battery.

Fig. 44 is a wiring diagram of another form of charging regulating means.

I have shown my transmission system in connection with an automobile, although the system is capable of broader application. From Figs. 1 and 2 it will be seen that the automobile 1 is provided with a heat engine 2 preferably of the internal combustion type. The shaft 3 of the latter, which I term the driving shaft, is adapted to be connected to the shaft 4, which I term the driven shaft, by instrumentalities hereinafter described. The last mentioned shaft is adapted to propel the vehicle through the usual connections, not shown. Calling attention to Fig. 1 it will be seen that I have illustrated a dynamo-electric machine G having a stationary field 5 and an armature 6 mechanically connected to the shaft 3 to be driven thereby or under certain conditions, as will hereinafter appear, to drive the same. A second dynamo-electric machine M has a stationary field 7 and an armature 8 mechanically connected to the shaft 4 to drive the same or under certain conditions, as will hereinafter appear, to be driven thereby.

In order to make the transmission as compact and light in weight as possible I prefer to use the arrangement illustrated in Fig. 1. A sleeve 9 is secured to the shaft 3 by any suitable means such as bolts 10 passing through the flange 11 of said shaft and screwed into said sleeve. The armature 6 is secured to said sleeve. As the dynamos are preferably of the direct current type a commutator 14 for the armature 6 is also secured to sleeve 9 between shoulder 12 and nut 13 and is provided with cooperating brush holders 15 which may be mounted on the frame 16 in any suitable manner. The nut 13 is shown secured to a member 17 carrying fan blades 18 for the purpose of circulating air to cool and ventilate the transmission parts in a manner presently to be described. The field poles of the machine G are fixed to the frame 16, the latter being of magnetic material so as to constitute the field yoke. The shaft 4 extends into the sleeve 9, a suitable bearing 19 being provided between said elements 4 and 9 to permit relative rotation thereof. The shaft 4 is also journalled by means of a bearing 21 in the end-bell 20 bolted or otherwise secured to the frame 16. The poles of the field 7 of the machine M are mounted on the frame 16 as in the case of the machine G. The armature 8 is secured to a sleeve 22 bolted on a hub 23, which hub may be keyed or otherwise fixedly secured to the shaft 4. The commutator 25 of the armature 8 may be secured in any suitable or conventional manner to hub 23. The brushes for the armature 8 are mounted in brush holders 26' secured to the end-bell 20.

The means for mechanically coupling shafts 3 and 4 together may be constructed and arranged substantially as follows: Screwed or otherwise secured to hub 23 and interposed between sleeve 22 and shaft 4 is an annular member 24 having circumferential teeth 26. An annular member 27 having cooperating clutch teeth 28 is splined or otherwise mounted for rotation with and sliding movement on sleeve 9. A plurality of springs, one of which is shown at 29, are interposed at certain points between member 27 and sleeve 9 and serve to retract member 27 to such position that teeth 26 and 28 are out of engagement. The said teeth may be of any suitable shape and are preferably inclined on the off edges of the teeth. For moving member 27 into a position wherein teeth 28 engage teeth 26, I have shown a magnetizing coil 30 mounted in an annular chamber within member 24. Member 27 is provided with an annular extension 31 underlying a part of coil 30 and overlying an annular extension 32 of member 24, whereby a ready path for the magnetic flux is provided. Members 24 and 27 are composed of magnetic material and it will be seen from the construction disclosed that, when coil 30 is energized, member 27 will be attracted against the action of springs 29 to cause teeth 28 to engage between teeth 26. For leading current to coil 30 I have shown collector rings 33 suitably insulated and mounted on a stationary member 34 fixed to end-bell 20. Said rings are adapted to be engaged by suitable brushes, one of which is shown at 35, said brushes being electrically connected with coil 30.

When shaft 3 is being driven by its engine, and it is desired to drive the shaft 4, to propel the vehicle, suitable connections may be established between the machines G and M to cause the former to act as a generator to supply electrical energy to the machine M to drive the latter as a motor and thereby rotate the shaft 4. This arrangement may be utilized for driving the shaft 4, that is the vehicle, at low speeds and the coil 30 may be energized to cause clutch members 24 and 27 to establish the one-to-one drive connection between the shafts 3 and 4 for the high speed transmission. Various means may be adopted for varying the generator and motor connections in order to control the speed of said shaft 4. One form of such means is illustrated in the drawings and may be constructed substantially as follows, but it will be understood that the specific form of controller shown is illustrative only and that the flexibility of the engine, as controlled through the usual throttle, plays a large part in the rate of acceleration in controlling the voltage supplied to the motor by varying the engine and hence the generator speed.

The field of the machine G is of the multi-polar type, being shown as having its poles each provided with a winding $5^a$ to $5^f$. The machine M is similarly constructed, the field windings or coils being designated $7^a$ to $7^f$. This arrangement is clearly illustrated in Fig. 5 of the drawings. If the machine G is so connected that the windings $5^a$, $5^c$, and $5^e$ establish field poles of the same polarity and the windings $5^b$, $5^d$, and $5^f$ of the opposite polarity, the machine will generate its maximum voltage, assuming of course that the armature 6 is rotated by the engine. Furthermore, if the machine M is so supplied with electrical energy that the windings $7^a$, $7^c$, and $7^e$ establish poles of the same polarity and the windings $7^b$, $7^d$, and $7^f$ of the opposite polarity armature 8 will rotate at a comparatively low speed. The operation of the transmission system for low speed drives may be substantially as follows:

For the lowest speed of shaft 4 the connections illustrated in Fig. 11 may be established. In this figure one terminal of the armature 6 is connected to one end of each of the windings $5^e$ and $5^f$. Two branch circuits are established between this point and one of the terminals of the armature 8. One of these branches comprises the windings $5^f$, $5^a$, $5^b$, $5^c$, $7^f$, $7^a$, and $7^b$, all in series, while the other branch comprises the windings $5^e$, $5^d$, $7^e$, $7^d$, and $7^c$, all in series. The remaining terminals of the armatures 6 and 8 are connected to each other. It will be noted that current flows through winding $5^f$ in such a direction as to reverse the field pole magnetized by that winding, with the result that the machine G, which is acting as a generator, generates a comparatively low voltage and consequently the motor shaft 4 rotates at a comparatively low speed. The shaft 4 may be caused to speed up by establishing the connections shown in Fig. 12, which are similar to those in Fig. 11 except that one of the terminals of the armature 6 is connected between coils $5^a$ and $5^f$ as well as between coils $5^e$ and $5^f$. The field pole $5^f$, which with the connections shown in Fig. 11 was reversed, is now cut out so that the voltage generated by the machine G is higher than that corresponding to the connections of Fig. 11. To speed up the said shaft 4 still more the connections illustrated in Fig. 13 may be established in which one terminal of armature 6 is connected between the field coils $5^a$ and $5^f$. Current now flows through winding $5^f$ in the reverse direction in which it flowed through said winding in Fig. 11, so that the pole magnetized by said winding is now a south pole. Hence all of the field poles energized by coils $5^a$, $5^c$, and $5^e$ are now of one polarity while the remaining poles are of the opposite polarity. The machine G is, therefore, connected to generate its maximum voltage. In order to speed the shaft 4 up still more the field connection of the machine M may be varied as indicated in Fig. 14. In this figure one terminal of the armature 8 is connected between windings $7^b$ and $7^c$ and also between windings $7^c$ and $7^d$, so that winding $7^c$ is cut out of the circuit and the counter-electromotive force of the machine M is decreased, thus causing the armature 8 to speed up. The speed of the shaft 4 may be brought up still higher by reversing field coil $7^c$ by establishing connections such as illustrated in Fig. 15. In this figure the connection between the field and armature of the machine M is changed so that the armature terminal is connected between the coils $7^c$ and $7^d$, whereby the pole corresponding to winding $7^c$ is reversed and the speed of armature of machine M increased. The design is preferably such that when the connections illustrated in Fig. 15 are established the ratio of the speed of shaft 4 to that of shaft 3 will be a maximum. In other words, when the last mentioned connections are established the speed of shaft 4 will exceed that of the shaft 3.

I prefer to call the jaw clutch members 24 and 27 into action to assume the major portion of the load when the speed of shaft 4 tends to equal or exceed that of shaft 3, or has any predetermined established speed ratio desired. This means that the accelerating portion of the drive has accomplished its purpose and the time has come to practically eliminate it from the operation of the vehicle together with its losses and to substitute therefor the straight-through mechanical connection which has 100% efficiency. It is furthermore desirable that clutch teeth 26 and 28 be not brought into engagement until at a time when the speeds of shafts 3 and 4 are approximately the same. For causing the energization of coil 30 to clutch shafts 3 and 4 together under the conditions above mentioned I have provided means controlled directly by the relative speed of shafts 3 and 4. A rod 36 is slidably mounted within shaft 4 and carries at its rear end an arm 37 projecting through a slot 38 in shaft 4 (in which is placed a spacer 37'), whereby rod 36 is caused to rotate with said shaft. An annular member 39 is carried by arm 37 and is adapted to engage one end of a bell crank lever 40 mounted on a bracket 41 secured to the exterior of end-bell 20. The other arm of the bell crank lever is attached to a rod 42 connected with a clutch controller in a manner presently to be described, so that, when said bell crank lever is tripped by member 39, a circuit may be closed through coil 30. A spring 43 interposed between member 39 and a collar or abutment member 44 on shaft 4 serves to force rod 36 to its innermost position in said shaft. It will be understood that member 44 serves as a driving member of the two-part coupling to the propeller shaft. It will now be seen that if rod 36 is moved longitudinally against the action of spring 43, member 39 will trip bell crank lever 40. For causing such longitudinal movement of rod 36 the means shown in Fig. 1 and more in detail in Figs. 6 and 7 may be provided.

The end of rod 36 remote from ring 39 projects out through shaft 4 and into a chamber 45 in sleeve 9. An annular member 46 is attached to said projecting end of rod 36 and is provided on its face, as shown in Figs. 6 and 7 with curved channels 47 and 48 having oppositely inclined bottom surfaces adapted to receive balls 49. Said balls also engage a member 50 integral with or secured to member 11. The inclined bottom surfaces of channels 47, 48 are so designed that, when shaft 3 rotates faster than shaft 4, the balls 49 lie in the deepest portions of the channels. When, however, the shaft 4 commences to rotate faster than shaft 3, the portions of the channels of lesser depth are brought under balls 49 with the result that longitudinal movement is imparted to rod 36, and bell crank lever 40 is tripped by member 39.

When said bell crank lever 40 is tripped, as above set forth, the connections shown in Fig. 16 are established through means presently to be described. From this figure it will be seen that a short circuit path for the current around coil 30 no longer exists and the said coil hence forms part of the current path. It will be noted that motor M is not disconnected at this time but still acts to assume a small portion of the load. In this figure I have also shown one form of connections for charging a storage battery SB when the jaw clutch is called into action. One terminal of the battery is shown connected through an ammeter to a point between coil 30 and one terminal of armature 6 and the other terminal to a point intermediate the generator and motor fields. The theory of operation in connection with charging this battery will be clearly understood in view of the description of the remaining forms of the invention. While, in Fig. 16 field connections corresponding to Fig. 15 are shown, it will be understood that the same circuit through coil 30 and battery charging connections may be made when other field connections are established, as will appear later.

The machine G may be employed as a motor to start the engine by establishing the connections shown in Fig. 9 in which the storage battery is shown connected across the armature 6. One terminal of said battery is also shown connected to coils $5^c$ and $5^d$ of the generator field and the other terminal between coils $5^f$ and $5^a$. The armature 8 is not in the circuit so that the machine M is idle. With the connections made as described the storage battery SB supplies energy to the machine G to drive the latter as a motor with a comparatively strong field to start the engine.

For establishing the connections above described, as well as certain reversing and braking connections to be described later, various means may be provided. One form which such means may assume is shown in Figs. 21, 22, 23, and 24, and, diagrammatically in Fig. 26. As shown, such means consists of a set of controller drums comprising a main controller drum A, a braking controller drum B, and a clutch controller drum C. The said controller drums may be mounted on a shaft 51 supported in bearings in the end walls 52 and 53 and partition 54 of a supporting frame 55. The controller drum A is rigidly fixed to shaft 51, while drum B is loosely mounted with respect thereto, being fixed to a sleeve 56 surrounding shaft 51 and rotatable in a bearing 57 in partition 54. Controller drum C is loosely mounted on shaft 51 and is resiliently connected thereto by means of a coil spring 58, one end of which is attached to an arm 59 fixed to shaft 51 and the other end of which is secured in any suitable way to drum C, as by means of a screw 60. In Figs. 2 and 3 I have shown the set of controllers diagrammatically at D.

While various means may be employed for rotating shaft 51, the means illustrated in Figs. 2, 3, and 4 will be found convenient. Shaft 51 has secured thereto a beveled gear 61 which meshes with beveled sector 62 secured to a sleeve 63. The latter is mounted rotatably in the usual fixedly mounted steering column 64 and is adapted to be rotated by means of a handle or lever 65 secured thereto at its upper end. The members 63 and 64 are made in the forms of sleeves so that the usual steering, throttle, and other control members may extend therethrough. It will be evident that the shaft 51 may be rotated to various positions by turning lever 65.

I prefer to so design the controlling system as to cause the automobile to travel forwardly when the handle 65 is moved from the "off" position in one direction and to cause the automobile to travel backwards when said handle is moved in the opposite direction from said "off" position. I prefer also to cause the machine G to act as a motor to start the engine 2 when the handle 65 is moved to its extreme position in the direction in which it causes reversal of the automobile. The plate 66 in Fig. 4 shows that there are five speeds forward, two reverse, and the control handle 65 is moved through the reverse positions to reach the starting position "S". I provide automatic means for breaking the circuit between the machines G and M when the handle 65 is moved from the starting position through the reverse positions to the off position in order to prevent the vehicle from being driven backwards unintentionally. One form of such means is shown in Fig. 8 and diagrammatically in Fig. 26.

The controller drum A carries a pin 67 which travels in a slot 68 provided in a disc or drum 69 rotatably mounted on the shaft 51 adjacent one end of drum A. The disc 69 carries a conducting segment or band 70 which is continuous, except at 71 and is adapted to bridge the relatively stationary brushes 72, 73. As will be later apparent, the circuit between the field and armature 8 of the machine M is interrupted when the brushes 72, 73 are not bridged by the segment 70.

The operation of this portion of the invention is as follows: When the handle 65 is on the "off" or any of positions I to V the pin 67 occupies a position at the end of slot 68 opposite to the end in which the pin is shown in Fig. 8. If the handle 65 is moved from any of positions I to IV or "off" in reverse direction the pin 67 travels to the other end of the slot 68 as shown in Fig. 8. In the last mentioned figure the parts are shown in the position they occupy when the handle is moved toward the "S" position but only up to the second reverse point. It will be noted that the brushes 72, 73 are bridged by the segment 70. When the handle 65 is moved to the "S" position the disc 69 is rotated to such an extent that the brush 72 is no longer engaged by the segment 70. When the handle 65 is now moved from the "S" position toward the "off" position the controller drum A is rotated but the disc 69 remains stationary as the pin 67 moves idly in the slot 68 until the reverse points of the controller are passed. At this time the pin has traveled the full length of the slot so that before the "off" position is reached the disc 69 is actuated to cause the segment 70 again to bridge brushes 72, 73. In short, the brushes 72, 73 are bridged by the segment 70 except when handle 65 and drum A are on the two reverse positions while moving toward the "off" position after having been in the "S" position.

One form of connections for the transmission shown in Fig. 1 and employing the above described controlling means is shown diagrammatically in Fig. 26. The members SB, 6, 8, $5^a$ to $5^f$, $7^a$ to $7^f$, 70, 72, 73, and 30 will at once be recognized. Controllers A, B, and C are shown diagrammatically in development, as is also segment 70. The controllers are movable in the direction of the arrow X. Brushes $L_1$–$L_{13}$, inclusive, cooperate with conducting segments on controller A, brushes $L_{14}$–$L_{17}$, inclusive, with controller B, and brushes $L_{18}$–$L_{23}$, inclusive, with controller C. Brush $L_1$ is connected with one terminal of storage battery SB and also, through an ammeter, with brush $L_{19}$. Brush $L_2$ is connected between coils $5^a$ and $5^f$ of the generator field, and brush $L_4$ is connected between coils $5^e$ and $5^f$ of said field. Coil 30 is connected between brushes $L_3$ and $L_{16}$, the former brush being also connected with the brush $L_{18}$, and brush $L_{16}$ being further connected with brushes $L_{21}$ and $L_{22}$. The terminals of armature 8 are connected to brushes $L_5$ and $L_6$, respectively, and armature 6 is shown connected between brushes $L_{12}$ and $L_{14}$, an ammeter being shown inserted between said armature and brush $L_{14}$. Brush 72 is connected with the motor field between coils $7^b$ and $7^c$, while brush $L_9$ is connected to said field between coils $7^d$ and $7^e$. Brushes $L_{10}$ and $L_{20}$ are shown connected to a point Y between the fields of machines G and M, a resistance R being interposed in the connection between said point and brush $L_{20}$. The other terminal of battery SB is connected to brush $L_{11}$, which brush is also shown connected to a point Z between the generator and motor fields. Brushes 73 and $L_7$ are connected to each other and to brush $L_{23}$. Brushes $L_8$ and $L_{15}$ are also connected together, as are also brushes $L_{13}$ and $L_{17}$.

The brake controller, which may be operated by means to be described later, is normally in the position "B off", wherein brushes $L_{14}$ and $L_{16}$ engage segment $S_1$, and brushes $L_{15}$ and $L_{17}$ with segment $S_2$, in which position the brake is off. If, now, the main controller A be in the "off" position, the connections illustrated in Fig. 10 will be established. It will be seen from Fig. 26 that, with controller A in the "off" position, the motor and generator fields are dead since segment $S_3$ which is engaged by brush $L_6$ is electrically connected with segment $S_4$, which is engaged by brushes $L_3$ and $L_4$, and a short circuit path around the motor and generator fields is created from brush 6, through segments $S_3$, $S_4$, brushes $L_3$, $L_{18}$, segment $S_5$, brushes $L_{21}$, $L_{16}$, segment $S_1$, and brush $L_{14}$.

To start the engine, controller A is moved to the "S" position and the connections shown in Fig. 9 are established. Current now can flow from one terminal of battery SB to brush $L_{11}$ from which three current paths are provided as follows. One path comprises brush $L_{11}$, segment $S_8$, brush $L_{12}$, armature 6, brush $L_{14}$, segment $S_1$ brushes $L_{16}$ and $L_{21}$, segment $S_5$, brushes $L_{18}$ and $L_3$, segment $S_9$, brush $L_1$, and thence to the other terminal of the battery. Another path is from segment $S_{11}$, through brush $L_{10}$, point Y, field coils $5^c$, $5^b$, $5^a$, brush $L_2$, segment $S_9$, and back to the battery. The third path comprises brush $L_{11}$, point Z, field coils $5^d$, $5^e$, and $5^f$, and thence back to segment $S_9$ and the battery. The machine G is thus caused to act as a motor and turn over the engine of the automobile. In this position of the controllers, motor M is cut out. When drum A is placed on position I, the connections illustrated in Fig. 11 are established to cause the machine G to act as a generator to drive the machine M as a motor at a low speed, as already described. The circuit for this position of controller A may be traced as follows: From one terminal of armature 6 to brush $L_{12}$, segment $S_{10}$, brush $L_5$, armature 8, brush $L_6$, segment $S_3$, brush $L_{13}$, brush $L_{17}$, segment $S_2$, brushes $L_{15}$ and $L_8$, segment $S_{11}$, brushes $L_7$ and 73, segment 70, brush 72, the field of armature 8, between coils $7^b$ and $7^c$, the generator field to a point between coils $5^e$ and $5^f$, thence to brush $L_4$, segment $S_{12}$, brushes $L_3$ and $L_{18}$, segment $S_5$, brushes $L_{21}$ and $L_{16}$, segment $S_1$, brush $L_{14}$, and back to the other terminal of armature 6. It will be seen that in this position of the controller coil 30 is short circuited, since a path around said coil is provided from brush $L_3$, through brush 18, segment $S_5$, and brushes $L_{21}$ and $L_{16}$. This short circuit around coil 30 is, moreover, maintained regardless of the movements of controllers A and B and is broken only when controller C is moved to such position that the electrical connection is broken between brushes $L_{18}$ and $L_{21}$.

When controller A is moved to position II, the connections shown in Fig. 12 are established. The circuit is similar to that established by position I, with the exception that brushes $L_2$, $L_3$, and $L_4$, are now simultaneously bridged. Connections are made on each side of pole $5^f$, so that said pole is now cut out of the generator field. The vehicle now travels at a higher speed, as explained in connection with Fig. 12. If said controller be moved to position III, brushes $L_2$ and $L_3$ are bridged by segment $S_{12}$ and connections are established between coils $5^a$ and $5^f$, as shown in Fig. 13. When the controller is moved to position IV, brushes $L_7$, $L_8$, and $L_9$ are bridged by segment $S_{11}$, and pole $7^c$ is cut out of the motor field, so that the connections shown in Fig. 14 are established and a still higher speed of the vehicle is attained. When finally the controller A is moved to position V, brushes $L_8$ and $L_9$ are bridged by segments $S_{11}$ so that a connection is made at a point between coils $7^c$ and $7^d$ and the connections of Fig. 15 are established. In this position of the controller the motor field has been so weakened that the highest speed is attained, as has already been explained. The clutch controller is shown in Fig. 26 in the position it assumes after it has been thrown to break the short circuit around the clutch coil, and it will be understood that, until said controller is thrown, segment $S_5$ bridges brushes $L_{18}$ and $L_{21}$, regardless of the position of controller A. When, however, the speed of the drive shaft 4 tends to exceed that of the shaft 3, clutch controller C is thrown to the position shown in Fig. 26, wherein the gap in segment $S_5$ lies under brush $L_{18}$.

When the clutch controller assumes the last mentioned position, current will flow from brush $L_3$, through clutch coil 30, to brush $L_{16}$, and back to the generator. At the same time a current path is closed from point Z, through brush $L_{11}$, the battery SB, brush $L_1$, brush $L_{19}$, segment $S_6$, brush $L_{22}$, brush $L_{16}$, and back to the generator so that the storage battery may now be charged by the generator. So far as the charging function is concerned, the two machines G and M may be said to act as one machine having two armatures on the same shaft and two fields, since, when the charging connections are formed, the armatures 6 and 8 are constrained to operate at the same speed by virtue of the jaw clutch. The armature 8 develops a counter E. M. F. which opposes and reduces the E. M. F. of the machine G to hold the battery current down.

For maintaining the charging current of the battery SB practically constant, a resistance R having a fairly high positive temperature coefficient, for example, iron wire, may be shunted across part of the field of machine M when clutch controller C is thrown to the position shown in Fig. 26. When said clutch controller is so thrown, a shunt circuit is completed from a point between coils $7^b$ and $7^c$, through brush 72, segment 70, brush 73, brush $L_{23}$, segment $S_7$, brush $L_{20}$, and resistance R to point Y. With resistance R having the property above mentioned, an increase of the charging current above its desired value will cause the current through said resistance to increase and to cause an increase in the temperature and resistance of the latter. Hence a greater portion of the total current will flow through the coils $7^b$, $7^a$, $7^f$, so that the counter E. M. F. of the machine M will rise very rapidly compared to the rise in E. M. F. of the machine G. When the charging current decreases the temperature and resistance of R decrease so that a smaller proportion of current flows through coils $7^b$, $7^a$, $7^f$, and the counter E. M. F. of machine M will drop very rapidly compared to the drop in E. M. F. of machine G. In either event the charging current will be held practically constant.

When the engine is running and the controller is on any of positions I to V or "off", the automobile may be driven backwards at either of two speeds by placing the drum A on I R or II R. Placing the controller on I R establishes the connections illustrated in Fig. 17, which are the same as those of Fig. 11 except that the connections of armature 8 are reversed and the latter runs in the reverse direction, since brush $L_{12}$ is now electrically connected through segments $S_8$ and $S_3$, with brush $L_6$, whereas said brush $L_{12}$ was, in the forward speed positions of controller A, connected with brush $L_5$. The latter brush is, in the reverse positions of controller A, connected through segments $S_{10}$ and $S_{13}$ with brush $L_{13}$, which brush was formerly connected with brush $L_6$. On position II R the connections shown in Fig. 18 are established, said connections being the same as those shown in Fig. 12, except that armature 8 is reversed. While, in Fig. 26, the gap in segment 70 is shown in positions corresponding to I R and II R, it will be understood from the connection previously described between controller A and segment 70, that, when controller A is moved from the "off" position to a reverse position, segment 70 underlies brushes 72 and 73. As has been previously set forth, the only time when segment 70 does not bridge brushes 72 and 73 is when controller A is moving from "S" position through the reverse positions towards the "off" position.

If it is desired to brake or check the momentum of the vehicle the drum A should be placed on any of positions I to V and the drum B placed in its other position wherein brushes $L_{14}$ and $L_{15}$ are bridged by segment $S_1$, and brushes $L_{16}$ and $L_{17}$ by segment $S_2$. This reverses both sets of fields 5 and 7 with respect to their respective armatures 6 and 8. The machine M then acts as a generator to drive the machine G as a motor to drive the engine 2 thereby to impose a braking torque on the vehicle. Fig. 19 illustrates the connections when the drum A is on I and the drum B is thrown to braking position.

Figure 27:
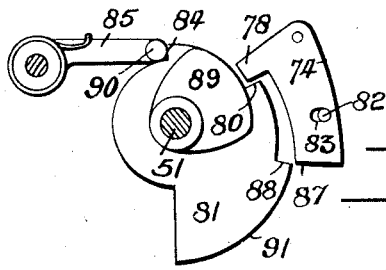

While the clutch controller may be thrown to clutch-operating position whenever the above mentioned speed relationship between shafts 3 and 4 is reached, regardless of the position of controller operating lever 65, I have shown, in Figs. 21, 22, 23, 24, and 27—32, means for permitting such operation of the clutch controller only when said lever is in either of positions IV or V. Of course, if desired, the clutch controller may be permitted to operate at any other positions or at all positions of lever 65, as will readily be apparent. For the purpose of illustrating one of a wide variety of possible means for operating the clutch controller when bell-crank lever 40 is tripped by ring 39, I have shown a rod 42 connected at one end to a rocking member or sear 74. The latter is shown pivoted to a bracket 75 upstanding from base 76 of supporting frame 55, and, at its upper end, is pivotally connected with the forked end of a member 77 to which rod 42 is attached. Normally when the ring 39 is out of engagement with bell crank lever 40 sear 74 is forced by a suitable spring 79 into a position wherein a projection 78 of the sear lies in the path of a shoulder 80 on a cam member 81, as shown in Fig. 27. Member 81 is secured to and movable with the clutch controller C. Sear 74 may be pivoted to bracket 75 by means of a pin 82 and an enlarged slot 83, the purpose of which enlarged slot will appear later.

Figure 28:
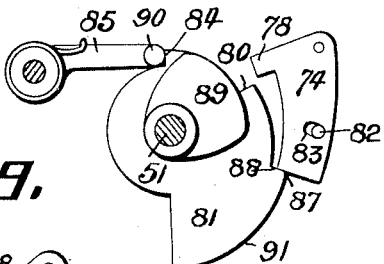
Figure 29:
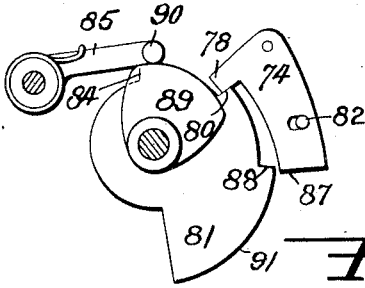
Figure 30:
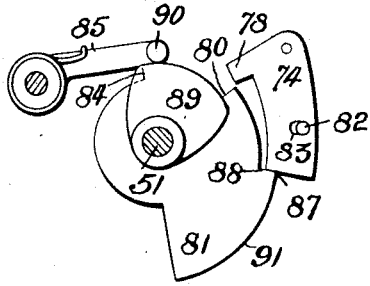

In the form of invention shown in Figs. 21, 22, 23, 24, and 27—32, controller C is movable with controller A until the latter reaches position III, when controller C is held against further movement while spring 58 is tensioned by continued movement of controller A. Spring 58 can then throw controller C to clutch operating position when said controller is released. When the controller A is in neutral or "off" position, spring 58 causes drum C to bring a pin 86 into engagement with arm 59 of shaft 51. If, now controller A and shaft 51 be moved in a counter-clockwise direction referring to Fig. 22, in which direction said parts must be moved to go to reverse or starting positions, controller C is caused by the engagement of arm 59 with pin 86 to follow the movement of shaft 51. When shaft 51 and arm 59 are moved in a clockwise direction, looking at Fig. 22, spring 58 will cause controller C to follow the movement of shaft 51 until by the time controller A reaches position III, a spring pressed member 85, pivoted in any suitable way to partition 54, engages a shoulder 84 on member 81 and prevents further movement of controller C. While spring 58 might equally well be tensioned by movement of arm 59 in a clockwise direction in Fig. 22, I have for purposes of illustration shown said spring as expanded thereby. In either case the spring will cause controller C to follow the movement of shaft 51. Member 85 is normally biased to a position wherein it engages the periphery of member 81. The position of members 80, 81, 84, 85, and 74 with controller A in "off" position, is shown in Fig. 23, and, with controller A in position III, in Fig. 27. It will now be seen that, if the speed of drive shaft 4 should momentarily exceed that of shaft 3, if, for instance, the vehicle were traveling down grade, controller C will not move to clutch operating position since arm 85 is in engagement with shoulder 84. During the movement of handle 65 and controlled A from position III to position IV a cam 89 fixed to rotate with shaft 51 engages a projection 90 on arm 85 and raises said arm out of engagement with shoulder 84. It may be desired to prevent controller C from being released at this time where projection 78 of sear 74 has been moved from engagement with shoulder 80 by the tripping of bell crank lever 40 during position III of controller A, and to this end the arrangement shown in Figs. 27, 28, 29, and 30 may be provided. In Fig. 28 it will be seen that the parts are in a position corresponding to position III of controller A and that sear 74 has been moved so that its projection 78 no longer engages shoulder 80 of member 81. However, an end portion 87 of sear 74 has been moved into engagement with a shoulder 88 on said member 81 and will prevent movement of controller C to clutch operating position if arm 85 should now be moved by cam 89 out of engagement with shoulder 84, as is shown in Fig. 30. Upon the dropping of the speed of shaft 4 to a point below or equal to the speed of shaft 3, sear 74 will be moved by spring 79 to its position shown in Fig. 29, wherein portion 87 of the sear is withdrawn from engagement with shoulder 88 and projection 78 lies in the path of shoulder 80.

In connection with Fig. 27 it should be noted that, when arm 85 was in engagement with shoulder 84 a slight clearance existed between shoulder 80 and projection 78. Hence, when the sear 74 returns to its position in Fig. 29, arm 85 being out of engagement with shoulder 84, controller C and member 81 can move slightly to an extent equal to the above mentioned clearance, until shoulder 80 engages tooth 78. The extent of this slight movement is sufficient to bring shoulder 88 beyond the path of motion of portion 87 of sear 74, as shown in Fig. 29, so that when said sear is again tripped portion 87 will not come into engagement with shoulder 88. If sear 74 has not been tripped while controller A is in position III and cam 89 moves arm 85 out of engagement with shoulder 84, controller C and member 81 will move as above explained, to bring shoulder 80 against tooth or projection 78. Of course, if desired, the shoulder 88 or portion 87 may be omitted and the controller be released directly from the lifting of arm 85 out of engagement with shoulder 84, assuming that sear 74 has previously been moved so that its projection 78 no longer lies in the path of shoulder 80.

Figure 31:
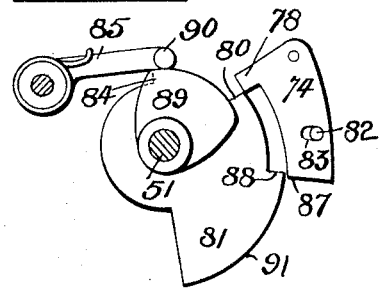

With controller A and handle 65 moving between positions III and IV, and the parts associated with controller C in the position shown in Fig. 29, an excess in speed of shaft 4 with relation to shaft 3 will cause sear 74 to be moved into the position shown in Fig. 31. In this position, projection 78 lies clear of shoulder 80 and portion 87 is clear of shoulder 88, and spring 58 now throws controller C into position for energizing coil 30, whereupon the parts assume the position shown in Fig. 32. In the latter figure cam 89 is shown in position corresponding to position IV of controller A.

Portion 91 of cam 81 beyond shoulder 88 is made slightly eccentric, so that, as it engages sear 74 said sear is moved on pin 82 a distance equal to the difference between the length of slot 83 and the diameter of pin 82. The purpose of this is to withdraw the end portion 92 of lever 40 from engagement with ring 39 and thus avoid unnecessary wearing away of said end portion. Normally when the speed of shaft 4 does not exceed that of shaft 3, spring 43 maintains ring 39 out of engagement with bell crank 40. When controller C is thrown by spring 58 from its position wherein it is held by sear 74 to a position wherein its pin 86 engages arm 59, a gap in contact segment $S_5$ comes under brush $L_{18}$, as explained in connection with Fig. 26, to break the short circuit around coil 30 and cause the energization of said coil. At the same time contact segments $S_6$ and $S_7$ establish the battery charging connections previously discussed.

If, after the controller C has been thrown to position for energizing coil 30, controller A and shaft 51 be turned back from position IV or V it will be evident that controller C will be moved in the same direction by the engagement of pin 86 with arm 59. As controller A continues its reverse motion back to position III controller C is thus moved to again establish a short circuit around coil 30 and to disestablish the battery charging connections. This electrical condition is maintained by controller C, as has been pointed out above, for all positions of controller A from S through III.

It will be seen from the above description that the clutch may be called into action independently of any particular position of controller A. Said controller A may be in position IV or in position V or moving between positions III and IV when the clutch comes into operation to assume the major portion of the load. The clutch, however, will not come into action, even though the controller A be in any of such positions, until the speed of shaft 4 begins to exceed that of shaft 3. It will be obvious that by varying the relative positions of arm 85, shoulder 84 and of projections 78 and shoulder 80, the controller C may bring the clutch into action during any desired range of positions of handle 65. Thus, by moving shoulder 84 nearer to arm 85, and correspondingly varying the position of shoulder 80 with relation to projection 78 and suitably designing cam 89 the clutch may operate after handle 65 moves from position II to the higher speed positions, or by moving shoulders 84 and 80 in the opposite direction with relation to arm 85 and projection 78 the operation of the clutch may be confined to positions of handle 65 between positions IV and V or at position V.

The brake controller B may be operated by the means shown somewhat diagrammatically in Fig. 34. A foot pedal 93 which is preferably mounted near the driver of the vehicle may be suitably pivoted so that when depressed, it will engage a projection 94 on a rod 95 and move said rod downwardly. The rod 95 may be connected to one arm of a bell crank lever 96, the other arm of which is connected in any suitable manner with an arm 97 secured to the sleeve 56 attached to braking drum B. In Fig. 34 the pedal 93 is shown depressed. A spring 98 may be provided to return pedal 93 and arm 97 to non-braking position.

In case arm 97 should be moved to braking position while clutch coil 30 is energized means may be provided for deenergizing said clutch coil automatically. Such means may take the form shown in Fig. 23, wherein a pin 99 or other projection is secured to member 81 at such a point that when controller C is thrown to position for energizing coil 30 said pin lies in the path of movement of arm 97. In Fig. 23 arm 97 is shown in non-braking position and the controller C and associated parts in "off" position. When the controller parts have been thrown to position for energizing coil 30 they assume the position shown in Fig. 32, which will bring pin 99 into a position wherein it will be engaged by arm 97 when the latter moves controller B to braking position. The parts are preferably so designed that by the time that controller B arrives at braking position, controller C will have been moved back to bring the shoulder 84 into engagement with arm 85, as shown in Fig. 27, so that coil 30 is deenergized and the drive connection between the engine and propeller shaft of the vehicle thus rendered inoperative.

It should be noted that when the controller B is in the braking position a variable braking torque may be exerted on the vehicle by moving the controller handle 65 from position V to position I, or vice versa as the said handle 65 is moved toward position V the braking torque is diminished whereas if it is moved in the opposite direction the braking torque is increased. Similarly the vehicle may be braked when running backward by depressing pedal 93 and moving handle 65 toward positions I R and II R.

It frequently happens that, when the generator and motor are running the motor runs momentarily faster than the generator, as when the vehicle is traveling down hill, for instance. The motor thus acts as a generator and supplies current to machine G driving the latter as a motor. Now if, while the motor M is runing at such speed, the engine be speeded up to drive the generator G at a greater speed or if the motor speed falls back below the original generator speed, current will flow back from generator G towards motor M. Even though the generator speed be not increased or the motor speed decreased, the motor can act only momentarily as a generator. This will be evident when it is considered that when the counter E. M. F. of the motor is increased sufficiently to exceed the E. M. F. of the generator the resulting current through the motor is in such a direction as to kill the motor field, so that the action of the motor as a generator is only momentary. The generator is thus driven for only a brief period as a motor and automatically becomes a generator again to furnish current to the motor. The surging back and forth or "hunting" of the current under these conditions is objectionable and to provide for its elimination I may connect the storage battery with the generator field so that part of the current from said battery is continually in circuit therewith after the ignition switch is closed. In Fig. 20, wherein the connections between machines G and M are similar to those of Fig. 10, corresponding to the "off" position of controller A, I have shown one terminal of the battery connected to a point 100 midway between the fields of the motor and generator and also "grounded" or connected to the vehicle frame. The other terminal of the battery is connected through an ignition switch 101 with the "grounded" primary of an inducton coil 102 and also with one terminal of armature 6. The secondary of the induction coil 102 is connected with the usual spark gaps, one of which is indicated at 103, for igniting the combustible mixture in the engine cylinders. Of course, instead of using the vehicle frame as part of the circuit between the battery and induction coil, an additional conductor may be utilized.

From the construction and arrangement disclosed it will now be seen that when ignition switch 101 is closed part of the current of battery SB will flow through the generator and motor fields. This part of the current will divide at point 100 and part will flow through the motor field and certain of the field coils of the generator. The strongest portion of the current which divides at point 100, however, will flow through the other field coils of the generator, thus strengthening the generator field with relation to the motor field sufficiently to prevent the motor from becoming a generator even though the motor be driven momentarily faster than machine G. The hunting above referred to is thus eliminated. Also, by having the battery connected as above disclosed with the generator field a definite set of poles is provided, so that the generator always builds up in one direction. A resistance 104 is inserted in circuit with the battery and fields of the motor and generator to cut down the current through said fields to a suitable amount. While the connections between machines G and M in Fig. 20 correspond to the "off" position of controller A, it will be obvious that the other connections previously mentioned in connection with controllers A, B, and C for varying the generator and motor fields, braking, etc., may be established as described above, the battery remaining connected with the ignition system and fields of the generator and motor in the manner shown in Fig. 20.

I find it highly desirable to ventilate and cool the transmission parts by causing fan blades 18 to draw air over said parts and expel the air through suitable parts 105 in the transmission casing 16. Openings 106 and 107 may be provided at any desired number of points in the periphery of sleeve 9 so that air may be drawn through said openings and aid in cooling armature 6. Air is also between the armature and field of machine G. The air may be drawn through apertures 108 in casing 2 or in any other suitable manner. Openings 109 may be provided in end bell 20, and air may be drawn therethrough and through openings 110 in hub 23, 111 in member 24, around coil 30, through the gaps between teeth 26 and 28, apertures 112 in disc 17, out through ports 105. The air in its passage through apertures 110 and 111 carries away heat developed by the armature 8. Since, when clutch teeth 26 and 28 are engaged the armature 8 does not alone drive shaft 4 the heat developed in said armature is comparatively small and the passage of air through ports 110 and 111 is unnecessary. The engagement of teeth 26 with teeth 28 prevents the passage of air through said ports 110 and 111 since the air can no longer pass between the said teeth. At all times, however, a passage for air exists through openings 109, between the field and armature of machine M, openings 112, and out through openings 105. The openings 105 and 109 may be protected by suitable screens 113 as shown. It will thus be seen that simple and efficient means for cooling the transmission parts are provided.

The operation of the invention may be summarized as follows. The engine may be started by placing handle 65 on position "S". After the engine is running the said handle may be restored to "off" position. Although it is necessary to pass through positions II R and I R to attain the "off" position from position "S" the vehicle will not travel backwards at this time due to the fact that the connection between the armature 8 and the junction of the coils 7ᵇ and 7ᶜ is open at brushes 72 and 73 as previously explained. With the engine 2 running and the control member 65 in the "off" position the vehicle 1 may be caused to travel forward at any one of five successively increasing speeds by placing said handle on any one of positions I to V or, if the member 65 is on any of the positions "off" or I to V the vehicle may be caused to travel backwards at a comparatively low speed by placing said member on position I R. A higher reverse speed may be reached by placing said control member on position II R.

When the handle 65 is on any one of said positions I to V· the machine G acts as a generator to supply the machine M as a motor. As above stated the flexibility of the engine plays a very important part in the acceleration of the vehicle in any of the above controller or speed positions without further movement of the controller, so that the acceleration is primarily due to the very great flexibility of the engine speed and the torque follows from the same cause due to the differential speeds between the motor and the generator demonstrating one of the greatest values of the electro-dynamic system in that the torque is greatest at start or when the motor has zero or a very low speed, and becoming less intense as the relative speeds decrease. The above controller positions, it will at once be seen, are simply means for giving different gradients to the torque relation established by the differential speeds. The jaw clutch will be called into action during either of positions IV or V or while handle 65 is moving from position III to position IV, provided, of course, that the speed of the drive shaft 4 exceeds that of engine shaft 3. When the clutch coil 30 is energized by the operation of controller C the battery charging connections are established. It will readily be seen that the clutch is operated directly by the relative speed of shafts 3 and 4 and does not depend upon the arrival of the controller A at any particular or certain point nor upon variations in the current or voltage of the transmission system. At the same time, while the jaw clutch is in action, the motor M may aid to some extent in driving the load, as above explained, if desired, but the amount of current used by the motor at that time is negligible owing to the battery charging connections (see Fig. 16).

If it is desired to brake or check the momentum of the automobile 1 the handle 65 is placed on any one of positions I to V and the controller B is operated by any suitable means to reverse the connections of the fields 5 and 7 with respect to their respective armatures 6 and 8. The battery SB supplies energy to start the engine on position "S" and is charged when the clutch is called into operation. The battery may also be connected permanently to the generator field, as shown in Fig. 20, and when so connected will insure that the generator will always build up in the same direction and will also prevent the motor from momentarily becoming a generator, and the consequent hunting of current is thus eliminated. It will be understood, of course, that this battery may also be employed for supplying the lighting and ignition and other circuits common to automobiles.

In Fig. 35 I have shown another form of means for operating a clutch controller. The clutch controller C' is shown in this figure as mounted on a shaft 105, which shaft is independent of and separate from the shaft of the main controller. Controller C' may have contact segments similar to segments $S_5$, $S_6$, and $S_7$, cooperating with suitable brushes. A spring 106 which may be connected at one end with a fixed member 107 and at its other end with a projection or arm 108 on shaft 105, serves to bias the controller to a position such that segment $S_5$ no longer bridges contact brushes $L_{21}$ and $L_{18}$ and so that the storage battery charging connections are established. A spring pressed sear 74' may be connected with bell crank lever 40 by a rod 42' and may be pivotally mounted in the same way as sear 74. A projection 78' of said sear 74' may engage a shoulder 80' on a member 81' movable with drum C' so that said controller or drum can not be thrown to clutch operating position until projection 78' is withdrawn from engagement with shoulder 80' by the operation of lever 40. An arm 118, pivoted to any suitable support 109, is normally held by a spring 110 in a position where the end of said arm engages a shoulder 111 on member 81'. As long as arm 118 occupies its position shown in Fig. 35, it will be evident that the engagement of ring 39 with lever 40 and consequent tripping of sear 74' will not result in the throwing of controller or drum C' to clutch operating position. In order to place the parts in condition for enabling the controller C' to be thrown to clutch operating position, arm 118 may be formed as the armature of a solenoid 112. Said solenoid may be energized by a suitable switch (not shown) adjacent the driver of the vehicle and may be supplied with current from the battery SB. It will now be clear that when the driver of the vehicle desires to release the clutch operating parts for operation by bell crank lever 40 all that is necessary is to close the circuit through solenoid 112, whereupon arm 118 will be withdrawn from engagement with shoulder 111. Upon the speed of shaft 4 commencing to exceed that of shaft 3, sear 74 will be tripped to remove its projection 78' from engagement with shoulder 80'. Thereupon spring 106 will throw the controller C' to position for placing coil 30 in the circuit and establishing the battery charging connections. The controller C may be returned to its original position wherein coil 30 is short circuited and the battery charging connections broken by any convenient means. For instance, as shown in Fig. 35 a flexible member or cord 113 may be connected to projection 108 at one end and at its other end to a lever 114 adjacent the driver of the vehicle. Upon moving lever 114 in the proper direction controller C' will be restored to its position shown in Fig. 35 and will be held therein if the circuit through solenoid 112 be broken by the engagement of arm 118 with shoulder 111. The circuit through solenoid 112 may be broken, if desired, immediately after the clutch has been called into action. In this form of clutch controller operating means it will be seen that the clutch may come into operation at any position of controller A and that the clutch operating means does not depend for any of its motion on said controller A and depends solely upon the relative speed between the driving and driven members. Numerous modifications of my forms of clutch operating means will readily occur to those skilled in the art.

In Figs. 36 and 37 I have shown another form of means for energizing the clutch coil and establishing the storage battery charging connections when the speed of the motor shaft commences to exceed that of the engine shaft. A pair of differential gears 119, 120, are shown engaged by differential pinions 121, 122, and are driven respectively by the motor shaft and the engine shaft. Thus, shaft 123 on which gear 119 is mounted may be the speedometer shaft of the vehicle, which shaft is commonly connected with the drive shaft, and shaft 124 on which gear 120 is mounted may be the pump shaft of the vehicle, which shaft is commonly driven by the engine. Gears 121 and 122 are rotatably mounted in a member 125 supported on shaft 124 for rotation with respect thereto and carrying an annular gear member 126. Meshing with said gear 126 is a pinion 127 which may be loosely mounted on a shaft 128 for rotation with respect thereto. Shaft 128 may be mounted in a suitable supporting bracket 129 as shown. Also loosely mounted on shaft 128 is an arm 130 carrying at its end a contact 131. A spring 132 interposed between said arm and a nut or other projection on shaft 128 serves to force said arm into engagement with a friction disc 133 between said arm and pinion 127. As a result when gear 126 turns in the direction of the arrow as when shaft 123 commences to rotate faster than shaft 124, in Fig. 37, arm 130 will be moved until contact 131 strikes a cooperating contact 134. Further rotation of gear 126 in the direction of the arrow will, of course, be permitted by the frictional mounting of arm 130 with relation to gear 126. If, now, the rotation of gear 136 should be reversed, as when shaft 124 rotates faster than shaft 123, arm 130 would be moved into engagement with a suitable stop 135. With the construction above described, arm 130 is arranged to move into contact with stop 135 on rotation of shaft 124 faster than shaft 123, and said arm will be moved to bring contact 131 into engagement with contact 134 when shaft 123 commences to rotate faster than shaft 124. A circuit will thereby be closed to cause the clutch coil to be energized and storage battery charging connections to be established in a manner presently to be described.

An alternative form of differential means for establishing the battery charging connections and energizing the clutch coil is shown in Figs. 38 and 39, wherein parts corresponding with parts of Figs. 36 and 37 are designated by the same numerals with a prime added. Mounted on shaft 123' for rotation with respect thereto is a member 137 carrying on its periphery a pair of prongs or projections 138, 139, the former of which is provided with a contact 140. A suitable anti-friction bearing 142 may be interposed as shown between shaft 123' and member 137. A forked spring member 136 may be provided to bear at one end of its forks against member 137 with sufficient pressure to prevent rotation of said member in response to rotation of shaft 123'. Member 125' is shown provided with a projecting contact 141 which contact lies between prongs 138 and 139. With this construction, rotation of shaft 124' at a rate in excess of rotation of shaft 123' will cause contact 141 to engage prong 139, whereby member 137 will be rotated along with member 125'. When, now, shaft 123' commences to rotate faster than shaft 124', member 125' is turned in the reverse direction to bring contact 140 into engagement with contact 141. A circuit, as hereinafter disclosed, will thereby be closed to energize the clutch coil and establish the storage battery charging connections. Spring 136, of course, permits rotation of member 137 in response to rotation of member 125'. Current may be led to contact 141 by means of a brush 143 and a slip ring 144, the latter being carried by member 125'. Contact 140 may be suitably connected to a slip ring 145 on member 137 and current may be led to said slip ring through spring member 136.

While the circuit closed by the contacts 131, 134, or 140, 141, may establish the aforementioned connections in various ways, I have shown in Fig. 41 a relay 146 in said circuit, adapted, on closing of the circuit, to establish said connections. The differential circuit closer is shown diagrammatically in the form of contacts 147 adapted to be bridged by member 148. When the circuit through the winding of relay is closed, the relay armature 146 is moved in the direction of the arrow in Fig. 41 to engage the upper row of contacts. A circuit will thereby be established from generator armature 6, through motor armature 8, fields 7 and 5, clutch coil 30 to point 152 and back to generator armature 6. Part of the current will pass from point Z in the generator and motor fields, through battery SB, contacts 150 and 149, point 152, and back to generator armature 6. At the same time the shunt circuit around part of the motor field for regulating the charging of the battery, as above discussed in detail, is closed from one terminal of the armature 8 through contacts 153 and 154, resistance R, and point Y. Another circuit is closed from point 155 through the relay coil, contacts 151 and 149 and back to generator armature 6. This latter circuit insures that relay armature 146 will be held in engagement with the upper row of contacts once the circuit has been closed by the differential circuit closer, even though the contacts 131, 134, or 140, 141 be subsequently moved apart. It is found in practice that after said contacts come into engagement with each other they are not always held in engagement even though the one-to-one drive connection be established. By the means which I have provided, however, once the said contacts are brought into engagement, the relay armature 146 is held in engagement with the upper row of contacts until the circuit through the relay winding is broken by means under the control of the driver of the vehicle, which means will be described later.

It will be evident that the winding of relay 146 may be energized at any time that the speed of shaft 123 or 123' tends to exceed that of the corresponding shaft 124 or 124', regardless of the position of controller A. I prefer, however, to provide means for limiting the operation of relay 146 to positions II–V, inclusive, of said controller, since it may not be desirable to establish the high speed connections while said controller is in position I. The aforesaid means may take the form shown in Fig. 42, wherein a segment $S_{14}$ on controller A is adapted to bridge brushes $L_{24}$ and $L_{26}$ on positions II–V, inclusive, of said controller. Brushes $L_{24}$ and $L_{26}$ are of course connected in the circuit of relay 146. It will be noted that, in Fig. 42, the connections to controller A are substantially the same as in Fig. 26, except that said controller is provided with two additional segments $S_{14}$, $S_{15}$, and with additional brushes $L_{24}$–$L_{27}$, inclusive. The brake controller B is the same as in Fig. 26, and the clutch controller C of Fig. 26 is omitted, its function being performed by relay 146. I have shown brushes $L_{26}$, $L_{27}$ and segment $S_{15}$ for the purpose of limiting the operation of relay 146 to position V of controller A, if it should be desired. Brushes $L_{26}$ and $L_{27}$ are shown connected together and to brush $L_{11}$. Brushes $L_{24}$ and $L_{25}$ are connected to a point 156 in the circuit of relay 146, a switch 157 being interposed between brush $L_{24}$ and point 156. Said switch 157 is preferably located on the dashboard of the vehicle, adjacent the operator, and, when open, prevents the operation of relay 146 until controller A is in position V. When switch 157 is closed, relay 146 can be operated during any of positions II-V, inclusive, of controller A, as will readily be seen.

From the system above described it will be seen that, as long as relay armature 146 bridges contacts 158, 159, the controller A may be moved to any of its positions "off", S, I R, II R, or I-V, inclusive, whereupon circuits similar to those outlined in Figs. 9-19, inclusive, will be established. Thus, if controller A be moved to position II, and the armature 6 be turned by the engine 2, current will flow from armature 6, to brush $L_{12}$, segment $S_{10}$, brush $L_{5}$, motor armature 8, brush $L_{6}$, segment $S_{3}$, brush $L_{13}$, brush $L_{17}$, segment $S_{2}$, brush $L_{15}$, brush $L_{8}$, segment $S_{11}$, brush $L_{7}$, brush 73, segment 70, brush 72, the field of motor M between coils $7^b$ and $7^c$, the field of generator G between coils $5^a$, $5^f$, and $5^e$, $5^f$, brushes $L_2$ and $L_4$, segment $S_{12}$, brush L, contact 158, armature 146, contact 159, brush $L_{16}$, segment $S_1$, brush $L_{14}$, and back to armature 6. If now, switch 157 be closed, and the speed of the motor shaft commences to exceed that of the engine shaft, relay 146 will be energized and armature 146 will move into engagement with the contacts 149, 150, 151, 153, and 154. The short circuit path across coil 30 is broken by the disengagement of armature 146 from contacts 158 and 159, and the storage battery charging and other connections are established as outlined in connection with Fig. 41.

Assuming that relay 146 has been energized in any of positions II, III, or IV of controller A, it will be seen that said relay can be deenergized by moving switch 157 to open the circuit from brush $L_{24}$ to said relay. When said switch is closed, controller A being in any of the above mentioned positions, a circuit is closed from point Z in the generator and motor field connections, to brush $L_{11}$, brush $L_{26}$, segment $S_{14}$, brush $L_{24}$, switch 157, the winding of relay 146, contact 151, contact 149, and back to the armature 6. Opening switch 157 thus breaks the circuit through the relay and armature 146 may be returned by a spring (not shown), or any other suitable means, into engagement with contacts 158 and 159. If controller A be on position V when relay 146 is energized, the circuit through the relay winding cannot be broken unless switch 157 be opened and controller A be moved back to position IV. I prefer to provide means whereby the circuit through the relay 146 can be broken by merely moving controller A in the reverse direction from that in which it is moved in going from a lower to a higher speed position, so that operation of switch 157 is unnecessary. Such means may take the form shown in detail in Fig. 40 and constructed substantially as follows: Frictionally mounted on the shaft 51 of controller A is an arm 160 provided at one end with a contact portion 161 adapted to engage between a pair of cooperating contacts 162, the latter being connected in circuit with the winding of relay 146 as shown in Figs. 41 and 42. The other end of arm 160 may be forked and provided with suitable frictional adjusting means, such as a screw 163 and spring 164. When controller A is moved in a forward direction, that is in the direction in which it is moved in going from a lower to a higher speed position, contact 161 is held engaged between cooperating contacts 162. When, however, rotation of controller A is reversed, contact 161 is withdrawn from engagement with contacts 162, and arm 160 is moved against a suitable stop 165. The circuit through relay 146 is thus broken.

In Fig. 43 I have shown an alternative arrangement for regulating the charging of battery SB. A voltage regulator F of any suitable type may be provided, as shown, for establishing a shunt connection across the motor field when the voltage of the battery falls below a predetermined value. The regulator F is shown as comprising a coil 166 connected across the battery terminals and adapted to attract an armature 167 to break the shunt connection across the motor field when the voltage of the battery reaches a predetermined value. The counter E. M. F. of the motor is thereby increased and hence the voltage impressed by the generator on the battery is diminished. When said voltage falls below a predetermined value the armature 167 is retracted by a spring 168 to close the shunt circuit around the motor field, a suitable resistance R' being inserted in said shunt circuit. The counter E. M. F. of the motor is thus decreased and the charging voltage of the generator increased. The voltage impressed upon the storage battery may thus be held substantially constant. This system of regulation is found particularly useful at lower speeds of running of the vehicle. The regulating shunt circuit containing resistance R, previously described, may be utilized simultaneously with the shunt circuit containing resistance R' and regulator F or either one of said shunt circuits may be utilized by itself.

If desired, the motor may be entirely cut out of circuit when the clutch energizing and battery charging connections are established.

In Fig. 44 I have shown one arrangement which such connections may assume when the motor is disconnected. In this figure the clutch coil 30 is shown connected across the terminals of the storage battery and in circuit with armature 6, while a voltage regulator F' is provided for establishing and disestablishing a shunt circuit around the generator field in accordance with the voltage of battery SB. A suitable resistance R" is shown in said shunt circuit. Coil 166' of regulator F' is shown connected across the terminals of said battery, and, when the charging voltage rises beyond a predetermined amount, attracts armature 167' to close the shunt circuit around the generator field. The voltage supplied by the generator thus falls. When said voltage drops to a predetermined value, spring 168' retracts armature 167' and opens said shunt circuit, whereupon the voltage supplied by the generator rises. Regulator F' thus serves to maintain the charging voltage substantially constant.

In accordance with the provisions of the Patent Statutes, I have herein described the principle of operation of my invention, together with the apparatus, which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. In an electric transmission system for automotive vehicles, the combination with a prime mover, of a generator connected therewith, a driven element, a motor coupled thereto and electrically connected with said generator, and means controlled by the relative speed of said prime mover and driven element for coupling said driven element to said prime mover.

2. In a variable speed transmission system for automotive vehicles, the combination with a driving member, of a generator connected therewith, a driven member, a motor coupled thereto and adapted to be driven from said generator, means for coupling said driving and driven members together, and means controlled by said driving and driven members for bringing said coupling means into action when the speeds approach equality.

3. In an electric transmission system for automotive vehicles, the combination with a driving member, of a generator connected therewith, a driven member, a motor coupled thereto and electrically connected with said generator, means for varying the speed of said motor, means for coupling said driving and driven elements together, and means primarily independent of any particular point in the operation of the means for varying the speed of the motor and controlled directly by the relative speed of the driving and driven members for calling the coupling means into action.

4. In a variable speed transmission system for automotive vehicles, the combination with a driving member, of a generator connected therewith, a driven member, a motor coupled thereto and adapted to be driven from said generator, a controller movable to different positions for varying the speed of said motor, and means controlled by the relative speed of the driving and driven members for coupling said driving member to said driven member, said controller being operable to prevent the operation of said means when in the reverse position.

5. In an electric transmission system for automotive vehicles, the combination with a driving element, of a generator connected therewith, a driven element, a motor coupled thereto and electrically connected with said generator, a controller movable to vary the speed of the motor, means for clutching the driving and driven elements together, and means for calling the clutching means into action when a certain relationship between the speeds of the driving and driven member has been attained, regardless of the actual speeds of the elements but prevented from acting except when the controller is in a predetermined position.

6. In an electric transmission system for automotive vehicles, the combination with a prime mover, of a generator connected therewith, a driven member, a motor coupled thereto and electrically connected with said generator, a clutch between said prime mover and said driven member, and means independent of variations in the current and voltage of the transmission system and controlled directly by the relative speed of said driven member and prime mover for operating said clutch.

7. In an electric transmission system for automotive vehicles, the combination with a prime mover, of a generator connected therewith, a driven member, a motor coupled thereto and electrically connected with said generator, a clutch for coupling said driven member to said prime mover. means including a controller for operating said clutch and means controlled by the relative speed of said prime mover and driven member for actuating said controller.

8. In an electrical transmission system for automotive vehicles, the combination with a prime mover, of a generator connected therewith, a driven member, a motor coupled thereto and electrically connected with said generator, a non-slip clutch between said driven member and said prime mover, and means controlled by the relative speed of said prime mover and said driven member for operating said clutch.

9. In a variable speed transmission system, for automotive vehicles the combination with a prime mover, of a generator connected therewith, a driven member, a motor coupled thereto and adapted to be driven from said generator, a non-slip clutch for coupling said driven member with said prime mover, and automatic means for operating said clutch when the two parts thereof reach substantially the same speed.

10. In an electric transmission system for automotive vehicles the combination with a prime mover, of a generator connected therewith, a driven member, a motor coupled thereto and electrically connected with said generator, a non-slip clutch between said driven member and said prime mover, means including a controller for operating said clutch, and means governed by the relative speed of said driven member and said prime mover for actuating said controller.

11. In an electric transmission system, for automotive vehicles the combination with a prime mover, of a generator connected therewith, a driven element, a motor coupled thereto and electrically connected with said generator, a non-slip clutch between said driven element and said prime mover, and means independent of variations in the current and voltage of the transmission system and controlled by the relative speed of the prime mover and driven element for operating said clutch.

12. In an electric transmission system, the combination with an internal combustion engine, of a generator connected therewith, a driven element, a motor coupled thereto and electrically connected with said generator, means for igniting the combustible mixture in said engine, a battery for continuously maintaining a difference of potential across at least a portion of the generator field, and means for simultaneously establishing a connection from said battery to said igniting means and to said generator field, for the purpose specified.

13. In an electric transmission system, the combination with a driving member, of a generator connected therewith, a driven member, a motor coupled thereto and electrically connected with said generator, a jaw clutch interposed between said driving and driven members, and means for drawing air around parts of said generator and said motor, said jaw clutch being so positioned that when in inoperative position the gaps between its teeth form part of the passage for the air through the motor parts.

14. The combination with a prime mover, of a generator driven thereby, a motor, an electrical connection between the dynamo and the motor, a driven member actuated by the motor, a non-slip clutch for forming a one-to-one drive connection between the dynamo and the motor, and means for calling said clutch into action when the motor circuits have been adjusted for a substantial speed but less than the maximum speed.

15. The combination with a prime mover, of a generator driven thereby, a motor operatively connected with the generator, a driven member actuated by the motor, a clutch for coupling said driven member to said prime mover, means movable to a position for calling said clutch into action, and means driven differentially by said prime mover and said driven member for operating said first named means when the speeds of said prime mover and driven member become substantially equal.

16. In combination with an automotive vehicle, a prime mover, a generator driven thereby, a motor adapted to be driven from said generator, a driven member actuated by said motor, a clutch for coupling said driven member to said prime mover, a movable member driven differentially from said prime mover and said driven member, and means connected with said movable member for calling said clutch into action upon change in the direction of movement of said movable member.

17. In combination, a prime mover, a generator driven thereby, a motor operatively connected with said generator, a driven element actuated by said motor, means for coupling said driven element to said prime mover, means controlled by the relative speed of the prime mover and driven element for calling said coupling means into action, and means independent of the speed controlled means for maintaining the coupling means in operation after it has been called into action.

18. In combination, a prime mover, a generator driven thereby, a motor operatively connected with said generator, a driven element actuated by said motor, a clutch for coupling said driven element to said prime mover, means driven differentially by said prime mover and said driven element for calling said clutch into action, and means independent of the first named means for maintaining the clutch in operation after it has been called into action.

19. In combination, a prime mover, a generator driven thereby, a motor operatively connected with said generator, a driven element actuated by said motor, a controller for varying the speed of said motor, a clutch for coupling said driven element to said prime mover, means governed by the relative speed of the driven element and prime mover for calling said clutch into action, and means operable by movement of the controller in a given direction for throwing said clutch out of action.

20. In combination, a prime mover, a generator driven thereby, a motor electrically connected with said generator, a driven element actuated by said motor, a clutch for coupling said driven element to said prime mover, a storage battery, means including a relay for establishing connections for operating said clutch and charging said battery, and means driven differentially by said prime mover and said driven element for controlling the operation of said relay.

21. In combination, a prime mover, a generator driven thereby, a motor electrically connected with said generator, a driven element actuated by said motor, a clutch for coupling said driven element to said prime mover, means including a relay for calling said clutch into action, and means governed by the relative speed of the driven element and prime mover for controlling the operation of said relay.

22. In combination, a prime mover, a generator driven thereby, a motor electrically connected with said generator, a driven element actuated by said motor, a clutch for coupling said driven element to said prime mover, means including a relay for calling said clutch into action, a controller, and means driven differentially by said prime mover and driven element, and means whereby said controller and said last-named means together control the operation of said relay.

23. In combination, a prime mover, a generator driven thereby, a motor operatively connected with said generator, a driven element actuated by said motor, a clutch for coupling said driven element to said prime mover, a controller movable to a plurality of positions for varying the speed of said motor, means governed by the relative speed of the prime mover and driven element for calling said clutch into action, and means for selectively limiting the operation of said clutch to different positions of said controller.

24. In an electric transmission system, a prime mover, a generator driven thereby, a motor electrically connected with said generator, a driven element actuated by said motor, a storage battery, a clutch for coupling said driven element to said prime mover, and means controlled by the relative speed of said prime mover and driven element for establishing connections for operating said clutch and charging said storage battery.

25. In combination with an automotive vehicle, a prime mover, a generator driven thereby, a motor, an electric connection between the dynamo and the motor, a driven member actuated by the motor, a clutch for forming a drive connection between the dynamo and the motor, means for permitting the clutch to act when the motor circuits have been adjusted for less than the maximum speed and means controlled by the relative speed of the prime mover and drive element for bringing said clutch into action.

26. In a transmission system for automotive vehicles, the combination with the power source and the running gear, of variable speed means between said power source and gear for accelerating the vehicle, an alternative straight-through connection between said power source and gear, and means brought into action when the speed of the gear passes that of the power source for throwing said straight-through connection in.

27. In a transmission system for automotive vehicles, the combination with the power source and the running gear, of variable speed means between said power source and gear for accelerating the vehicle, a clutch directly connecting said source and gear, and means brought into action when the relative speeds of said source and gear approach a definite relationship for throwing in said clutch.

28. In a transmission system for automotive vehicles, the combination with the power source and running gear, of a generator connected to the former, a motor connected to the latter, a straight-through drive between said source and gear, automatic means for bringing in said drive at predetermined relative speeds of said source and gear, and means for throwing out said drive when braking the vehicle.

29. In an electric transmission system for automotive vehicles, the combination with a prime mover, of a generator connected therewith, a driven element, a motor coupled thereto and electrically connected with said generator, automatic means controlled by the relative speed of said prime mover and driven element for coupling said driven element to said prime mover, and means controllable at will for uncoupling said prime mover and driven element.

30. In an electric transmission system for automotive vehicles, the combination with a prime mover, of a generator connected therewith, a driven element, a motor coupled thereto and electrically connected with said generator, means controlled by the relative speed of said prime mover and driven element for coupling said driven element to said prime mover, a brake-applying device, and means actuated thereby for uncoupling said prime mover and driven element.

31. In combination, a prime mover, a generator driven thereby, a motor operatively connected with said generator, a driven element actuated by said motor, a controller for varying the speed of said motor, a clutch for coupling said driven element to said prime mover, means governed by the relative speed of the driven element and prime mover for calling said clutch into action, and means operable by a return movement of the controller toward neutral for throwing said clutch out of action.

32. In an electric transmission system for automotive vehicles, the combination with a prime mover, of a generator connected therewith, a driven element, a motor coupled thereto and electrically connected with said generator, means controlled by the relative speed of said prime mover and driven element for coupling said driven element to said prime mover, means for adjusting the circuits of the generator and motor for electrical braking, and means brought into action by said last named means for uncoupling said prime mover and driven element.

33. In a transmission system for automotive vehicles, the combination with the power source and running gear, of a generator connected to the former, a motor connected to the latter, a straight-through drive between said source and gear, automatic means for bringing in said drive at predetermined relative speeds of said source and gear, means for adjusting the motor circuits for dynamic braking, and means brought into action by said last-named means for throwing out said straight-through drive.

34. In a variable speed transmission system for automotive vehicles, the combination with a driving member, of a generator connected therewith, a driven member, a motor coupled thereto and adapted to be driven from said generator, means for coupling said driving and driven members together, and means brought into action when the speed of the driven element exceeds that of the driving element for throwing in said coupling means.

35. In a variable speed transmission system for automotive vehicles, the combination with a driving member, of a generator connected therewith, a driven member, a motor coupled thereto and adapted to be driven from said generator, means for coupling said driving and driven members together, differential means driven by said driving and driven members, a contact member connected thereto to be maintained in one position as long as the speed of the driving member remains the greater and to be thrown into a second position as the speed of the driven member becomes the greater, said coupling means being excited from said contact member when the latter is in said second position.

In testimony whereof I have affixed my signature.

ELMER A. SPERRY.